USOO9236090B2

(12) United States Patent
Nobori et al.

(10) Patent No.: US 9,236,090 B2
(45) Date of Patent: Jan. 12, 2016

(54) VIDEO GENERATING APPARATUS AND VIDEO GENERATING METHOD

(71) Applicant: Panasonic Corporation, Osaka (JP)

(72) Inventors: Kunio Nobori, Osaka (JP); Ayako Maruyama, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/218,022

(22) Filed: Mar. 18, 2014

(65) Prior Publication Data

US 2014/0199048 A1   Jul. 17, 2014

Related U.S. Application Data

(63) Continuation of application No. PCT/JP2013/003748, filed on Jun. 14, 2013.

(30) Foreign Application Priority Data

Jul. 20, 2012 (JP) .................................. 2012-161855

(51) Int. Cl.
*H04N 5/93* (2006.01)
*H04N 5/92* (2006.01)
(Continued)

(52) U.S. Cl.
CPC .............. *G11B 27/031* (2013.01); *H04N 7/183* (2013.01)

(58) Field of Classification Search
USPC ......... 386/326, 331, 333, 335, 336, 278, 280, 386/283; 382/232, 243, 253, 254, 256, 268
See application file for complete search history.

(56) References Cited

U.S. PATENT DOCUMENTS

| 5,920,650 A * | 7/1999 | Kazui et al. .................. 382/233 |
| 6,512,793 B1 * | 1/2003 | Maeda ..................... 375/240.08 |

(Continued)

FOREIGN PATENT DOCUMENTS

| JP | 9-130803 | 5/1997 |
| JP | 2001-155163 | 6/2001 |

(Continued)

OTHER PUBLICATIONS

International Search Report issued Jul. 30, 2013 in corresponding International Application No. PCT/JP2013/003748.

(Continued)

*Primary Examiner* — Daquan Zhao
(74) *Attorney, Agent, or Firm* — Wenderoth, Lind & Ponack, L.L.P.

(57) ABSTRACT

A video generating apparatus includes: a segmentation unit dividing each of pictures included in an input video sequence into multiple regions as divided regions, and generating partial video sequences each having a set of the divided regions associated with one another between the pictures; a removal region determining unit determining, as a removal region, a region of at least one of the objects included in the input video sequence; an occluded region completing unit generating a completed video sequence by completing an image in an occluded region for each of the partial video sequences, thereby completing the partial video sequences and by superimposing the completed partial video sequences over one another, the occluded region being a region of an other object occluded in the removal region by the at least one object; and a video outputting unit outputting the completed video sequence.

13 Claims, 35 Drawing Sheets

(51) Int. Cl.
  *H04N 5/917* (2006.01)
  *H04N 5/89* (2006.01)
  *H04N 5/84* (2006.01)
  *G11B 27/031* (2006.01)
  *H04N 7/18* (2006.01)
  *G06K 9/36* (2006.01)
  *G06K 9/42* (2006.01)
  *G06K 9/00* (2006.01)
  *G06K 9/46* (2006.01)

(56) References Cited

U.S. PATENT DOCUMENTS

| | | |
|---|---|---|
| 8,213,681 B2 | 7/2012 | Nobori et al. |
| 8,599,252 B2 | 12/2013 | Komoto et al. |
| 2011/0002509 A1 | 1/2011 | Nobori et al. |
| 2012/0206597 A1 | 8/2012 | Komoto et al. |
| 2012/0269393 A1 | 10/2012 | Komoto et al. |

FOREIGN PATENT DOCUMENTS

| | | |
|---|---|---|
| JP | 4542207 | 9/2010 |
| JP | 2010-282659 | 12/2010 |
| JP | 2011-76311 | 4/2011 |
| JP | 4979840 | 7/2012 |
| JP | 4994525 | 8/2012 |
| WO | 2010/079556 | 7/2010 |
| WO | 2012/014430 | 2/2012 |
| WO | 2012/101723 | 8/2012 |

OTHER PUBLICATIONS

Y. Wexler et al., "Space-Time Video Completion", Computer Vision and Pattern Recognition, 2004. CVPR2004. Proceedings of the 2004 IEEE Computer Society Conference on (Volume: 1), Jun. 27,-Jul. 2, 2004.

Yasuyuki Sugaya et al., "Multi-stage Optimization of Multi-body Motion Segmentation by Unsupervized Learning", IPSJ SIG Technical Report, CVIM, 2003-CVIM-138, May 2003, pp. 185-192 (with English abstract).

Tatsuya Yatagawa et al., "Dynamic background removal for video inpainting", IPSJ SIG Technical Report, vol. 2011-CVIM-179, No. 8, Nov. 17, 2011 (with English abstract).

Kedar A. Patwardhan et al., "Video Inpainting Under Constrained Camera Motion", IEEE Transactions on Image Processing, vol. 16, No. 2, Feb. 2007, pp. 545-553.

* cited by examiner

FIG. 9

|  |  | Region | | | | |
|---|---|---|---|---|---|---|
|  |  | A | B | C | D | E |
| Region | A |  | A | A | A | E |
|  | B | A |  | B | B | E |
|  | C | A | B |  | — | — |
|  | D | A | B | — |  | E |
|  | E | E | E | — | E |  |

FIG. 11

| State of partial video sequence | Completion technique for partial video sequence |
|---|---|
| Abutting on removal region | Complete |
| Not abutting on removal region | Not complete |

(a) Picture in t-th frame
(b) Picture in t + 1-th frame
(c) Picture in t + 2-th frame
(d) Picture in t + 3-th frame
(e) Picture in t + 4-th frame
(f) Picture in t + 5-th frame (a) Picture in t-th frame
(b) Picture in t + 1-th frame
(c) Picture in t + 2-th frame
(d) Picture in t + 3-th frame
(e) Picture in t + 4-th frame
(f) Picture in t + 5-th frame (a) Setting space-time window  (b) Searching for matching region (c) Completing image in occluded region (a) Picture in t-th frame
(b) Picture in t + 1-th frame
(c) Picture in t + 2-th frame
(d) Picture in t + 3-th frame
(e) Picture in t + 4-th frame
(f) Picture in t + 5-th frame (a) Picture in t-th frame
(b) Picture in t + 1-th frame
(c) Picture in t + 2-th frame
(d) Picture in t + 3-th frame
(e) Picture in t + 4-th frame
(f) Picture in t + 5-th frame

FIG. 24

| State of partial video sequence || Completion technique for partial video sequence |
| --- | --- | --- |
| State of removal region | Motion of divided region | |
| Not abutting | — | Not complete |
| Abutting | Static state | Generation of static background image |
| | Rigid motion | Generation of mosaic image |
| | Articulated motion | Space-time completion |

FIG. 28

| | | Region | | | |
|---|---|---|---|---|---|
| | | A | B | C | D |
| Region | A | | A | A | A |
| | B | A | | B | B |
| | C | A | B | | C |
| | D | A | B | C | |

(a) Picture in t-th frame   (b) Picture in t + 1-th frame (c) Picture in t + 2-th frame   (d) Picture in t + 3-th frame (e) Picture in t + 4-th frame   (f) Picture in t + 5-th frame (a) Picture in t-th frame
(b) Picture in t + 1-th frame
(c) Picture in t + 2-th frame
(d) Picture in t + 3-th frame
(e) Picture in t + 4-th frame
(f) Picture in t + 5-th frame

VIDEO GENERATING APPARATUS AND VIDEO GENERATING METHOD

CROSS REFERENCE TO RELATED APPLICATIONS

This is a continuation application of PCT International Application No. PCT/JP2013/003748 filed on Jun. 14, 2013, designating the United States of America, which is based on and claims priority of Japanese Patent Application No. 2012-161855 filed on Jul. 20, 2012. The entire disclosures of the above-identified applications, including the specifications, drawings and claims are incorporated herein by reference in their entirety.

FIELD

One or more exemplary embodiments disclosed herein relate to an image processing technique of generating, from an input video sequence including multiple objects, a video sequence or a still image by removing at least one of the objects.

BACKGROUND

Research and development has been conducted for techniques to generate, from an input video sequence including multiple objects, a video sequence or a still image by removing at least one of the objects. The techniques are basic ones to be commonly used for a wide range of applications, such as generating background images in image processing for monitoring cameras, generating sprite images in video coding, and completion of occluded region in generating multi-eye stereoscopic video images, as well as editing video sequences.

In editing a video sequence, described below is a typical procedure for generating a video sequence with an object removed. First, a user specifies an object to be removed from among multiple objects included in an input video sequence. Then, image processing is executed to complete an image (pixel value) of a region (occluded region) of another object occluded by the specified object.

Space-time completion is one of such techniques to complete an image in an occluded region. The space-time completion involves completing an image in an occluded region, based on an assumption that the image in the occluded region is found in a picture at a different time in the input video sequence. Specifically, the space-time completion involves searching a picture at a different time in the input video sequence for a region matching with the occluded region, and replicating the searched image in the similar region onto the occluded region (see Non-Patent Literature 1, or NPL 1 for example).

First, the technique in NPL 1 involves setting a space-time window to enclose an occluded region (region to be removed) in a temporal image included in a video sequence. Then, the technique involves searching multiple pictures included in the input video sequence for the matching region having the best matching color and motion with the color and motion in the space-time window. Then, an image in the searched matching region is replicated onto the occluded region. Hence, the technique in NPL 1 makes it possible to appropriately complete the image in the occluded region as far as the matching region is found in a different picture in the video sequence even though the occluded region is one for a dynamic object.

CITATION LIST

Non Patent Literature

[NPL 1]
Y. Wexler, E. Shechtman, M. Irani, "Space-Time Video Completion", CVPR2004

SUMMARY

Technical Problem

The above image processing technique, however, cannot appropriately complete an image in the occluded region, and the resulting video sequence cannot have an object appropriately removed.

One non-limiting and exemplary embodiment provides a video generating apparatus which appropriately completes, through image processing, an image in a region (occluded region) of an object occluded by at least one of multiple objects included in a video sequence, and appropriately generates a completed video sequence by removing the at least one of the objects.

Solution to Problem

In one general aspect, the techniques disclosed here feature a video generating apparatus for generating, from an input video sequence including objects, a video sequence by removing at least one of the objects. The video generating apparatus includes: a video obtaining unit which obtains an input video sequence including pictures; a segmentation unit which divides each of the pictures included in the input video sequence into multiple regions as divided regions, and generate partial video sequences each having a set of the divided regions associated with one another between the pictures; a removal region determining unit which determines, as a removal region, a region of at least one of the objects included in the input video sequence; an occluded region completing unit which generates a completed video sequence by completing an image of an occluded region for each of the partial video sequences, thereby completing the partial video sequences, and by superimposing the completed partial video sequences over one another the occluded region being a region of an other object occluded in the removal region by the at least one object; and a video outputting unit which outputs the completed video sequence.

General and specific aspects disclosed above may be implemented using a system, a method, an integrated circuit, a computer program, or a computer-readable recording medium such as a CD-ROM, or any combination of systems, methods, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

A video generating apparatus according to one or more exemplary embodiments or features disclosed herein can appropriately complete, through image processing, an image in a region (occluded region) of an object occluded by at least one of multiple objects included in a video sequence, and appropriately generates a completed video sequence by removing the at least one of the objects.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 9 exemplifies overlapping relationship information according to Embodiment 1.

FIG. 11 exemplifies a completion technique determining rule according to Embodiment 1.

FIG. 24 exemplifies a completion technique determining rule according to Embodiment 2.

FIG. 28 exemplifies overlapping relationship information according to Embodiment 2.

DESCRIPTION OF EMBODIMENTS

Figure 1:
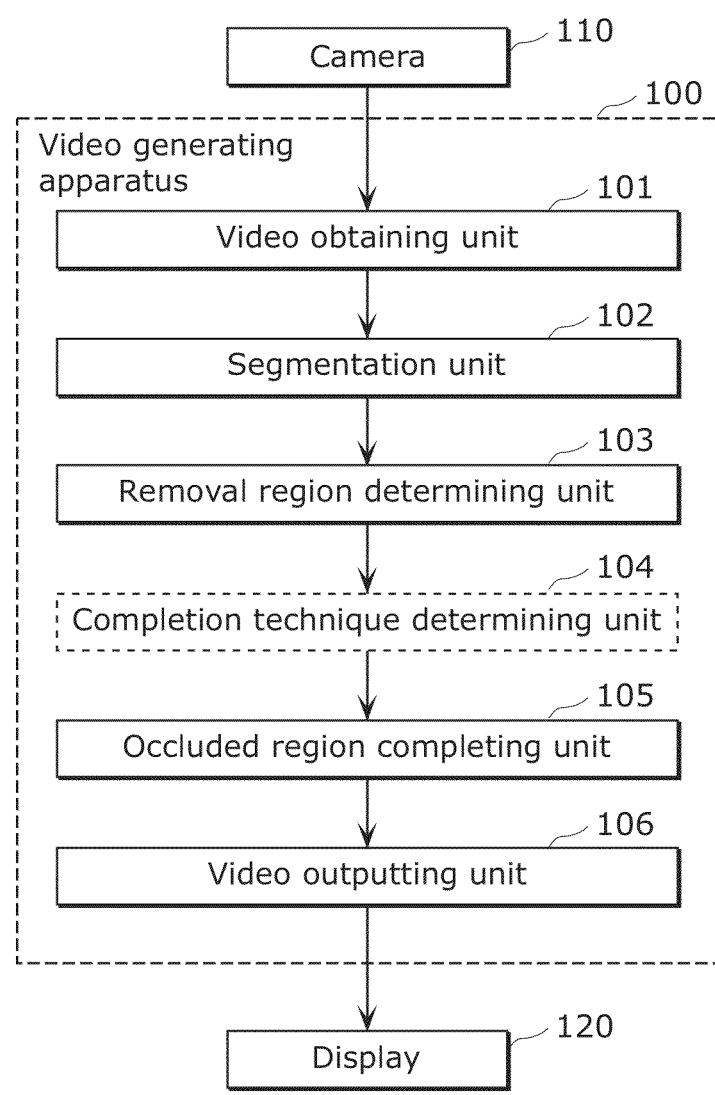
FIG. 1 illustrates a functional structure of a video generating apparatus according to Embodiment 1.

[Underlying Knowledge Forming Basis of the Present Disclosure]

In relation to the completion of an image in an occluded region disclosed in the Background Art section, the inventors have found a problem that the image in the occluded region cannot be appropriately completed in the case below.

When an object to be removed occludes multiple dynamic objects, there are very few chances that a matching region is found in another picture included in an input video sequence. In other words, a temporal change in the positional relationship between dynamic objects makes it less likely that, when the dynamic objects are occluded, the positional relationship between the dynamic objects reappears at a different time. As a result, it would be difficult to search for the matching region with the occluded region, leading to a challenge in appropriately completing an image in the occluded region.

In one general aspect, the techniques disclosed here feature a video generating apparatus for generating, from an input video sequence including objects, a video sequence by removing at least one of the objects. The video generating apparatus includes: a video obtaining unit which obtains an input video sequence including pictures; a segmentation unit which divides each of the pictures included in the input video sequence into multiple regions as divided regions, and generate partial video sequences each having a set of the divided regions associated with one another between the pictures; a removal region determining unit which determines, as a removal region, a region of at least one of the objects included in the input video sequence; an occluded region completing unit which generates a completed video sequence by completing an image in an occluded region for each of the partial video sequences, thereby completing the partial video sequences, and by superimposing the completed partial video sequences over one another, the occluded region being a region of an other object occluded in the removal region by the at least one object; and a video outputting unit which outputs the completed video sequence.

Such features allow the image generating apparatus to completion to complete an image in the occluded region for each of the partial video sequences. Hence, the image generating apparatus make it possible to complete an image in the occluded region for each of the partial video sequences corresponding to one of dynamic objects, even if the dynamic objects are occluded in a removal region by a removal target object. In other words, the image generating apparatus successfully completes an image in the occluded region for, for example, each of multiple dynamic objects regardless of the positional relationship between the dynamic objects, so that the resulting image in the occluded region is appropriately completed.

Furthermore, the features allow the image generating apparatus to generate a completed video sequence by superimposing the above-described completed partial video sequences over one another. Hence, the image generating apparatus successfully reflects, in the completed video sequence, the positional relationship between multiple dynamic objects, and the resulting completed video sequence is appropriately generated to adapt the positional relationship between the dynamic objects.

For example, the segmentation unit may estimate motion information on each of sets of the divided regions. The video generating apparatus may further include a completion technique determining unit configured to determine a completion technique for each of the partial video sequences based on the motion information on a set of the divided regions of the partial video sequence, and wherein, according to the determined completion technique, the occluded region completing unit may complete the image in the occluded region for each of the partial video sequences.

Such features allows the video generating apparatus to determine a completion technique for each of the partial video sequences based on the motion information on each of sets of the divided regions. In other words, the video generating apparatus can adaptively complete each of the partial video sequences depending on the motion of a divided region, contributing to more appropriately completing the image in the occluded region.

For example, the segmentation unit may estimate the motion information including information indicating whether or not each of sets of the divided regions presents an articulated motion, and if the estimation indicates that the articulated motion is presented in a set of the divided regions of a first partial video sequence included in the partial video sequences, the completion technique determining unit may determine a first completion technique, which is based on periodicity of the articulated motion, for completing the first partial video sequence.

If the articulated motion is presented in a set of the divided regions of in the first partial video sequence, such features allow the video generating apparatus to determine the first completion technique, which is based on the periodicity of the articulated motion, for completing the first partial video sequence. Hence, the video generating apparatus can determine the first completion technique suitable to the articulated motion for completing the first partial video sequence, and more appropriately complete an image in an occluded region included in the first partial video sequence.

For example, if the determination indicates that the first completion technique is for completing the first partial video sequence, the occluded region completing unit may, on each of pictures included in the first partial video sequence, (a) search an other picture included in the first partial video sequence for a matching region which matches a search target region including an occluded region in the picture, and (b) complete the image in the occluded region by replicating an image in the matching region onto the occluded region.

If the determination indicates that the first completion technique is for completing the first partial video sequence, such features allow the video generating apparatus to complete the image in the occluded region included in the first partial video sequence by replicating the image in the matching region, which is searched for in another picture, onto the occluded region. Hence, the video generating apparatus can complete the image in the occluded region more appropriately by a technique more suitable to the articulated motion.

For example, the segmentation unit may estimate the motion information including information indicating whether or not each of sets of the divided regions presents a rigid motion, and if the estimation indicates that the rigid motion is presented in a set of the divided regions of a second partial video sequence included in the partial video sequences, the completion technique determining unit may determine a second completion technique, which is different from the first completion technique and based on a characteristic of the rigid motion, for completing the second partial video sequence.

If the rigid motion is presented in a set of the divided regions of the second partial video sequence, such features allow the video generating apparatus to determine the second completion technique, which is based on the characteristic of the rigid motion, for completing the second partial video sequence. Hence, the video generating apparatus can determine the second completion technique suitable to the rigid motion for completing the second partial video sequence, and more appropriately complete an image in an occluded region included in the second partial video sequence.

For example, the segmentation unit may estimate the motion information including information indicating whether or not each of sets of the divided regions is in a static state, and if the estimation indicates that the static state is presented in a set of the divided regions of a third partial video sequence included in the partial video sequences, the completion technique determining unit may determine a third completion technique, which is different from the first completion technique and based on a characteristic of a static object, for completing the third partial video sequence.

If the static state is presented in a set of the divided regions of the third partial video sequence, such features allow the video generating apparatus to determine the third completion technique, which is based on the characteristic of the static object, for completing the third partial video sequence. Hence, the video generating apparatus can determine the third completion technique suitable to the static object as the completion technique for the third partial video sequence, and more appropriately complete an image in an occluded region included in the third partial video sequence.

For example, the segmentation unit may estimate a spatial overlapping relationship between the divided regions, and, based on the estimated spatial overlapping relationship, the occluded region completing unit may superimpose the completed partial video sequences over one another, and generate the completed video sequence.

Such feature allows the video generating apparatus to superimpose the completed partial video sequences over one another, based on the estimated overlapping relationship. Thus, the video generating apparatus can reflect, in a completed video sequence, an overlapping positional relationship between the occluded regions each included in one of the partial video sequences, and the resulting completed video sequence is more appropriately generated.

For example, the occluded region completing unit may complete the image in the occluded region only for a partial video sequence including a divided region which abuts the removal region, the partial video sequence being among the partial video sequences and the divided region being among the divided regions.

Such a feature allows the video generating apparatus to complete the image in the occluded region only for a partial video sequence including a divided region which abuts the removal region the partial video sequence being among the partial video sequences and the divided region being among the divided regions. Hence, the video generating apparatus can omit completing a partial video sequence which does not include a divided region that abuts the removal region. The omission contributes to reducing processing load and time.

For example, the occluded region completing unit may complete the image in the occluded region only for a picture including the divided region that abuts the removal region, the picture being included in the pictures in the partial video sequence including the divided region that abuts the removal region.

Such a feature allows the video generating apparatus to complete the image in the occluded region only for a picture including the divided region that abuts the removal region, the picture being included in the pictures in the partial video sequence. Hence, in completing the image in the occluded region included in a partial video sequence including the divided region that abuts the removal region, the video generating apparatus can omit completing a picture which does not include the divided region that abuts the removal region. The omission contributes to reducing processing load and time.

For example, the removal region determining unit may select at least one of the partial video sequences based on an input indicating the at least one of the objects, and determine, as removal regions, a set of the divided regions included in the selected at least one of the partial video sequences.

Such features allow the video generating apparatus to select at least one of the partial video sequences based on an input, and determine, as removal regions, a set of the divided regions included in the selected at least one of the partial video sequences. Thus, if at least one of divided regions is selected in one picture, the video generating apparatus successfully determines a removal region included in an input video sequence. In other words, the user does not have to execute multiple inputs to determine the removal region for multiple pictures, which allows the video generating apparatus to reduce troublesome operations for the user.

For example, for each of the partial video sequences, the occluded region completing unit may search on each of pictures which are included in a corresponding one of the partial video sequences, in another picture included in the corresponding one of the partial video sequences, for a matching region which matches with a search target region including an occluded region in the picture, replicate an image in the matching region onto the occluded region, and complete the image in the occluded region.

Such features allow the video generating apparatus to replicate an image in the matching region, which is searched for from another picture, onto the occluded region and complete the image in the occluded region included in each of the partial video sequences.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Hereinafter, certain exemplary embodiments are described in greater detail with reference to the accompanying Drawings. It is noted that excessive details of the embodiments may be omitted. For example, omitted may be details of already well-known cases or repetitive descriptions for substantially similar structures. This is to keep the descriptions below from being unnecessarily redundant, and facilitate the understanding of persons skilled in the art.

Each of the exemplary embodiments described below shows a general or specific example. The numerical values, shapes, materials, structural elements, the arrangement and connection of the structural elements, steps, the processing order of the steps etc. shown in the following exemplary embodiments are mere examples, and therefore do not limit the scope of the appended Claims and their equivalents. Therefore, among the structural elements in the following exemplary embodiments, structural elements not recited in any one of the independent claims are described as arbitrary structural elements.

In the present description, an object is a thing captured when obtaining input video sequence. Hence, the object includes a thing in the background in addition to the target object in the obtaining.

Embodiment 1

Described hereinafter is Embodiment 1 with reference to the drawings.

<Functional Structure of Video Generating Apparatus 100>

FIG. 1 illustrates a functional structure of a video generating apparatus 100 according to Embodiment 1. As illustrated in FIG. 1, the video generating apparatus 100 includes a video obtaining unit 101, a segmentation unit 102, a removal region determining unit 103, a completion technique determining unit 104, an occluded region completing unit 105, and a video outputting unit 106. The video generating apparatus 100 generates, from a video sequence (input video sequence) obtained as an input and including multiple objects, a video sequence by removing at least one of the objects. Hereinafter, the at least one of the objects to be removed is also referred to as removal target object.

In Embodiment 1, the video generating apparatus 100 obtains, from a camera 110, video captured by the camera 110 as the input video sequence. Moreover, the video generating apparatus 100 generates a completed video sequence by removing, from the input video sequence, the at least one of the objects specified by a user. A display 120 displays the completed video sequence outputted from the video generating apparatus 100. Described hereinafter is each of the units included in the video generating apparatus 100.

<Video Obtaining Unit 101>

The video obtaining unit 101 obtains an input video sequence including multiple pictures. Specifically, the video obtaining unit 101 is, for example, a camera and a communications interface connected to the camera.

<Segmentation Unit 102>

The segmentation unit 102 regionally divides the input video sequence obtained by the video obtaining unit 101. In other words, the segmentation unit 102 divides each of the pictures included in the input video sequence into multiple regions as divided regions. Then, the segmentation unit 102 generates partial video sequences each having a set of the divided regions that are associated with one another between the pictures. Furthermore, the segmentation unit 102 outputs regionally dividing information indicating the generated partial video sequences.

It is noted that generating a partial video sequence does not necessarily mean generating a single independent video sequence. In other words, generating a partial video sequence includes generating information indicating the partial video sequence. The information indicating a partial video sequence indicates, for example, (i) a position of each of the divided regions in each of the pictures and (ii) a corresponding relationship of the divided regions between the pictures.

In Embodiment 1, the segmentation unit 102 first estimates the motion between successive pictures. Based on the estimated motion, the segmentation unit 102 divides each of the pictures into multiple regions. Then, based on the estimated motion, the segmentation unit 102 associates each of the divided regions with one another between the pictures, and generates the regionally dividing information indicating (i) a position of each of the divided regions in each of the pictures and (ii) a corresponding relationship of the divided regions between the pictures. Hence, the segmentation unit 102 executes the regional division based on the motion, and generates the partial video sequences divided for each of the objects showing a different motion.

It is noted that the segmentation unit 102 does not have to divide each of the picture into multiple regions based necessarily on motions. The segmentation unit 102 may divide each of the pictures into multiple regions based on, for example, image features (such as luminance and color). Moreover, the segmentation unit 102 may divide each of the pictures into multiple regions based on, for example, a combination between the motion and the image feature.

The segmentation unit 102 does not have to associate each of the divided regions with one another between the pictures based necessarily on motions. The segmentation unit 102 may associate each of the divided regions with one another between the pictures based on, for example, positions of the divided regions in the pictures. The segmentation unit 102 may associate each of the divided regions with one another between the pictures based on, for example, image features of the divided regions. The segmentation unit 102 may associate each of the divided regions with one another between the pictures based on, for example, any given combination of motions, positions, and image features.

In Embodiment 1, the segmentation unit 102 further estimates a spatial overlapping relationship between divided regions. Specifically, the segmentation unit 102 estimates overlapping relationship information indicating, for example, which of the two abutting regions among multiple regions is closer to the camera (in a foreground).

<Removal Region Determining Unit 103>

The removal region determining unit 103 determines the region of a removal target object. In other words, the removal region determining unit 103 determines, as a removal region, a region of at least one of the objects included in an input video sequence.

In Embodiment 1, the removal region determining unit 103 selects at least one of partial video sequences based on an input indicating at least one of the objects included in the input video sequence. Then, the removal region determining unit 103 determines, as the removal region, at least one set of the divided regions included in the selected at least one of the partial video sequences.

To be more specific, for example, the removal region determining unit 103 receives from the user an input for selecting at least one of the partial video sequences via an input device such as a mouse and a keyboard. The removal region determining unit 103 then selects a partial video sequence based on the received input, and determines, as removal regions, a set of divided regions included in the selected partial video sequence.

<Completion Technique Determining Unit 104>

The completion technique determining unit 104 selects an occlusion partial video sequence including an occluded region from the partial video sequences, based on the partial video sequences generated by the segmentation unit 102 and on the removal region determined by the removal region determining unit 103.

It is noted that the occluded region is a region of an object occluded in the removal region by the removal target object. In other words, the occluded region is a region of an object which does not appear in the input video sequence because of the removal target object. An exemplary occluded region is a region of an object (i) found on a line between the camera and the removal target object and (ii) positioned farther from the camera (in the background) than the removal target object is.

Furthermore, the completion technique determining unit 104 determines a technique to complete an image (completion technique) in the occluded region included in the selected occlusion partial video sequence.

<Occluded Region Completing Unit 105>

The occluded region completing unit 105 completes an image in an occluded region for each of the generated partial video sequences, thereby completing the partial video sequences. Furthermore, the occluded region completing unit 105 superimposes the completed partial video sequences over one another, and then a completed video sequence is generated as a result.

In Embodiment 1, based on (i) occlusion partial video sequences selected by the completion technique determining unit 104 and (ii) a completion technique determined by the completion technique determining unit 104 and utilized for each of the occlusion partial video sequences, the occluded region completing unit 105 completes images in an occluded region included in the occlusion partial video sequences and generates completed partial video sequences. Furthermore, the occluded region completing unit 105 generates a completed video sequence by superimposing over one another the generated completed partial video sequences and partial video sequences, based on the overlapping relationship information estimated by the segmentation unit 102.

<Video Outputting Unit 106>

The video outputting unit 106 outputs to the display 120 a generated completed video sequence. It is noted that the video outputting unit 106 does not have to output the completed video sequence necessarily to the display 120. For example, the video outputting unit 106 may output the completed video sequence to a recording medium (such as a hard disc drive, an optical drive, and a semiconductor memory). Moreover, for example, the video outputting unit 106 may output the completed video sequence to a terminal (such as a smart phone and a personal computer) outside the video generating apparatus via a communications network.

It is noted that each of the constituent elements included in the video generating apparatus 100 may be implemented in the form of software such as a program executed on a computer and of hardware such as an electronic circuit and an integrated circuit.

<Hardware Structure of the Video Generating Apparatus>

Figure 2:
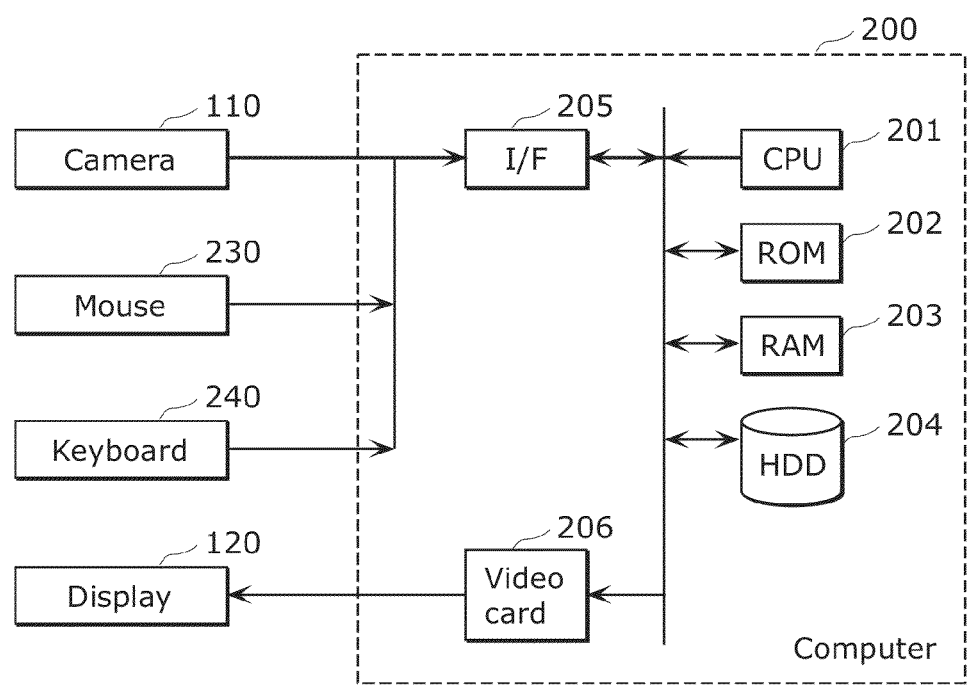
FIG. 2 exemplifies a hardware structure of the video generating apparatus implemented in the form of a computer.

FIG. 2 exemplifies a hardware structure of the video generating apparatus implemented in the form of a computer. In FIG. 2, the camera 110 obtains and outputs video sequences. A computer 200 obtains video (input video sequence) from the camera 110, and generates a completed video sequence by removing at least one of the objects from the input video sequence. The display 120 displays the completed video sequence generated by the computer 200.

The computer 200 includes a central processing unit (CPU) 201, a read only memory (ROM) 202, a random access memory (RAM) 203, an HDD 204, an interface (I/F) 205, and a video card 206. A program to run the computer 200 is previously stored in the ROM 202 or the HDD 204. The program is read from the ROM 202 or the HDD 204 and unfolded in the RAM 203 by the CPU 201 acting as a processor. The CPU 201 executes each of coded instructions included in the program unfolded in the RAM 203. Based on the execution of the program, the I/F 205 sends the RAM 203 a picture obtained by the camera 110. The I/F 205 receives from the user an input (input) via a mouse 230 or a keyboard 240. The video card 206 outputs video generated based on the execution of the program. The display 120 displays the outputted video.

It is noted that the computer program does not have to be stored only in the ROM 202—that is a semiconductor—and in the HDD 204; instead, the computer program may be stored, for example, in a CD-ROM. Furthermore, the computer program may be distributed through a wired or wireless network and broadcasting, and sent to the RAM 203 in the computer 200.

<Operation of Video Generating Apparatus 100>

Described next is an operation of the video generating apparatus 100 according to Embodiment 1, with reference to FIG. 3.

Figure 3:
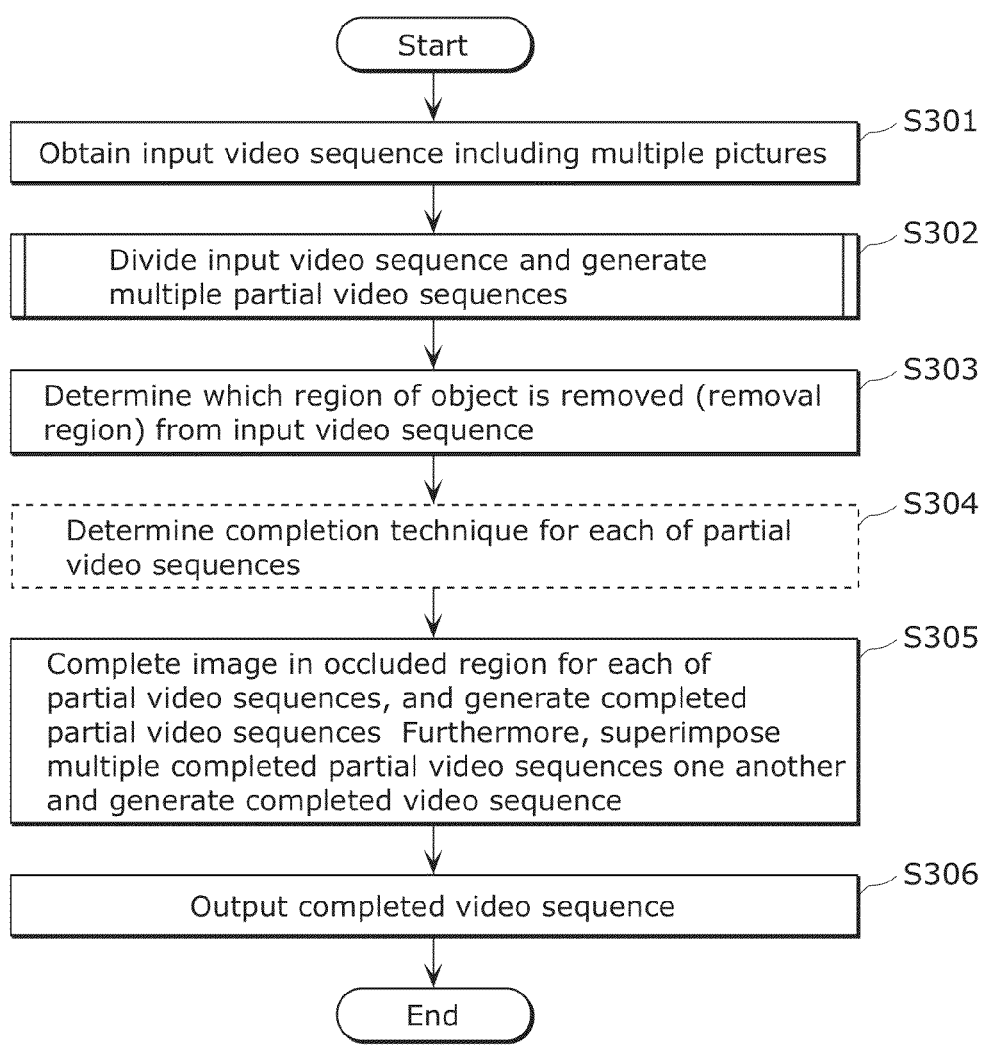
FIG. 3 depicts a flowchart representing an operation of the video generating apparatus according to Embodiment 1.

FIG. 3 depicts a flowchart representing an operation of the video generating apparatus 100 according to Embodiment 1. The six Steps S301 to S306 in FIG. 3 respectively correspond to units 101 to 106 in FIG. 1. In other words, the video obtaining unit 101 executes a video obtaining step S301. The segmentation unit 102 executes a regionally dividing step S302. The removal region determining unit 103 executes a removal region determining step S303. The completion technique determining unit 104 executes a completion technique determining step S304. The occluded region completing unit 105 executes an occluded region completing step S305. The video outputting unit 106 executes a video outputting step S306.

First, the video obtaining step S301 is executed by the video obtaining unit 101. The video obtaining unit 101 obtains from the camera 110 multiple pictures included in an input video sequence. In Embodiment 1, the input video sequence obtained from the camera 110 is of 1080×1920 (height to width in pixels)×30 frames/second.

Figure 4:
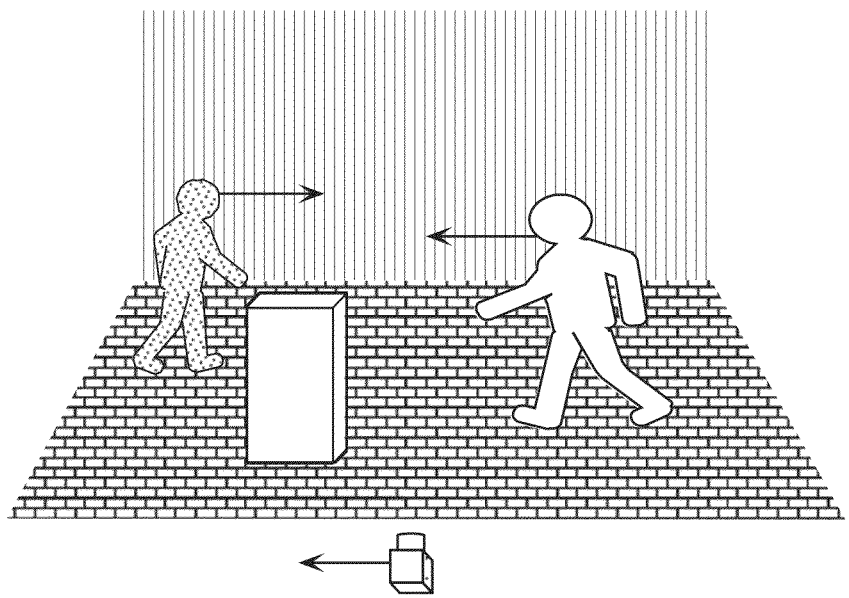
FIG. 4 exemplifies how a video sequence is captured according to Embodiment 1.

FIG. 4 exemplifies how a video sequence is captured in Embodiment 1. Embodiment 1 describes how the video generating apparatus 100 operates, using, as an exemplary input video sequence, a video sequence obtained showing a scene of two people walking by the camera 110 in moving. Other than the people, the scene includes an object of a box (cuboid) staying still in the real space.

Figure 5:
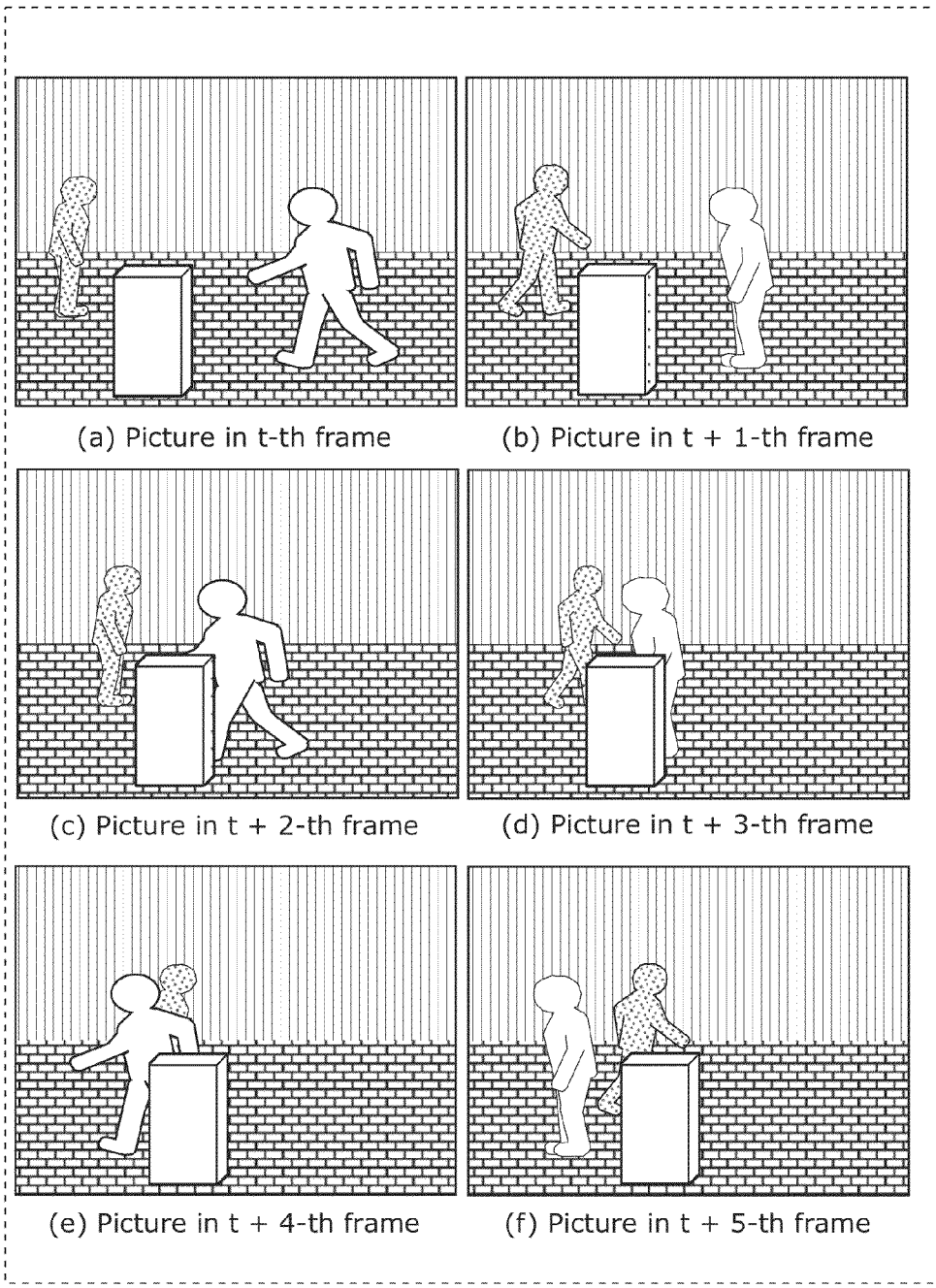
FIG. 5 exemplifies multiple pictures included in an input video sequence according to Embodiment 1.

FIG. 5 exemplifies multiple pictures included in the input video sequence according to Embodiment 1. Specifically, the illustrations (a) to (f) in FIG. 5 exemplify pictures obtained in the capturing by the camera 110 of the scene illustrated in FIG. 4. Here, the video obtaining unit 101 obtains multiple pictures (N frames). In Embodiment 1, the inputted video sequence is a 10-second (N=300) video sequence.

Next, the regionally dividing step S302 is executed by the segmentation unit 102. The segmentation unit 102 obtains the pictures from the video obtaining unit 101. Then, the segmentation unit 102 divides each of the pictures into multiple regions as divided regions for each object, and generates partial video sequences each having a set of divided regions associated with one another between the pictures. The technique used in the regionally dividing step S302 according to Embodiment 1 involves regionally dividing the video sequence based on a motion between the pictures.

Described hereinafter is an exemplary operation (the regionally dividing step S302) of the segmentation unit 102, with reference to FIGS. 6 to 8. Exemplified here is how to regionally divide the input video sequence, using a technique to regionally divide a video sequence based on a motion between the pictures in T frames.

Figure 6:
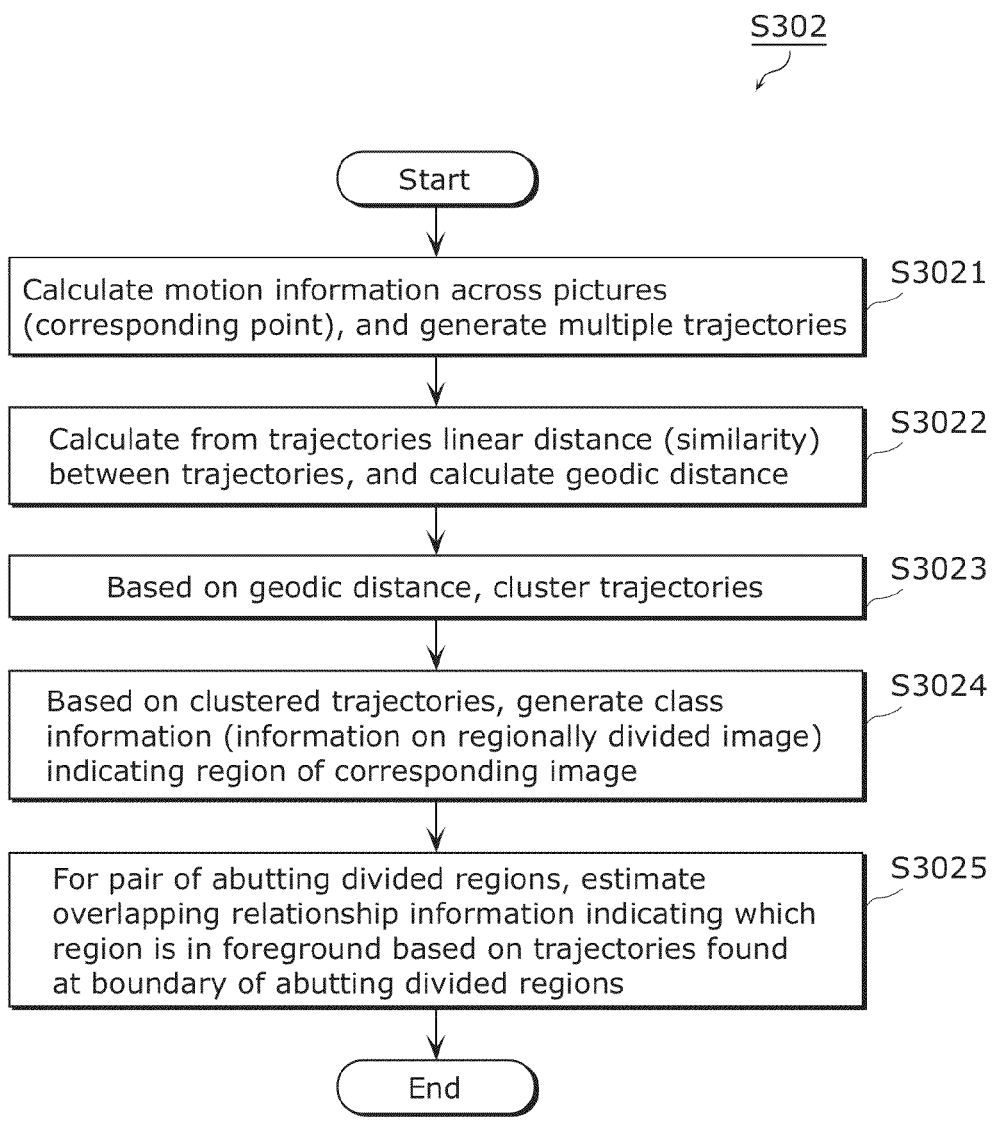
FIG. 6 depicts a flowchart representing an operation of a segmentation unit according to Embodiment 1.
Figure 7:
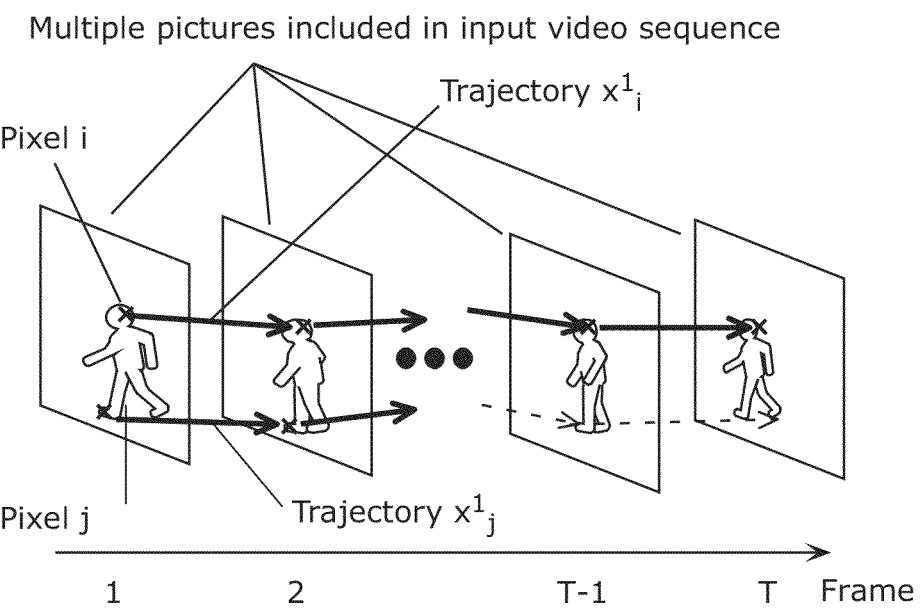
FIG. 7 exemplifies trajectories according to Embodiment 1.

FIG. 6 depicts a flowchart illustrating an operation of the segmentation unit 102 according to Embodiment 1. In other words, FIG. 6 is a flowchart representing a detailed operation in the regionally dividing step S302.

In a trajectory generating step S3021, the segmentation unit 102 obtains an input video sequence and detects corresponding points across T pictures included in the input video sequence. Then, the segmentation unit 102 generates trajectories based on the detected corresponding points. In Embodiment 1, a trajectory $x^i$ represents corresponding points across T pictures from the first frame to the T-th frame. The segmentation unit 102 generates the trajectory $x_1^i$ in Expression 1 for each of pixels i based on the coordinates $(x_1^i, y_1^i)$ of the pixel i on a picture in the first frame and on the pixel coordinates $(x_t^i, y_t^i)$ of the corresponding point of the pixel in the t-th frame (FIG. 7).

[Math. 1]

$$x_1^i = (x_1^i, y_1^i, \ldots, x_t^i, y_t^i, \ldots, x_T^i, y_T^i) \qquad \text{Expression 1}$$

Next, in a geodetic distance calculating step S3022, the segmentation unit 102 calculates a Euclidean distance indicating the similarity between the generated trajectories. Furthermore, the segmentation unit 102 calculates a geodetic distance based on the Euclidean distance. The geodetic distance indicates the similarity between two trajectories and represents, using another trajectory as a relay point, the shortest distance for one of the paths from one of the trajectory to the other trajectory.

Next, in a trajectory clustering step S3023, the segmentation unit 102 clusters the trajectories based on the calculated geodetic distance between the trajectories.

Next, in a regionally dividing information generating step S3024, the segmentation unit 102 associates, based on the clustered trajectories, each of the pixels in T pictures with the class including a trajectory which is closest to the trajectory for the each of the pixels. In other words, the segmentation unit 102 executes regional division, using a set of pixels associated with one class in each picture, and generates, as a partial video sequence, a set of divided regions associated with the same class across the pictures.

The regional division technique in the above trajectory generating step S3021 to the regionally dividing information generating step S3024 is disclosed in PTL 1 (Japanese Patent No. 4542207) and NPL 2 (Yasuyuki Sugaya and Kenichi Kanatani, "Multi-stage Optimization of Multi-body Motion Segmentation by Unsupervised Learning", The Special Interest Group Technical Reports of Information Processing Society of Japan CVIM, 2003-CVIM-138, May 2003, pp. 185-192). Hence, the detailed description thereof shall be omitted. It is noted that PTL 1 discloses a technique to regionally divide a video sequence including a non-rigid body, such as a human, based on a motion between pictures. NPL 2 discloses a more typical technique to classify, based on Expression 1 indicating motions of multiple points on T pictures, regions to which each of the points belongs.

Finally, in an overlapping relationship estimating step S3025, the segmentation unit 102 extracts all the pairs of abutting divided regions from among the divided regions generated in the regionally dividing information generating step S3024. Then, for each extracted pair of the divided regions, the segmentation unit 102 estimates overlapping relationship information indicating which of the two divided regions is in the foreground (closer to the camera), based on a motion observed in the vicinity of the boundary that the two divided regions share (motion between pictures).

Specifically, the segmentation unit 102, for example, extracts trajectories within a predetermined distance from the boundary between the two divided regions. Then, the segmentation unit 102 estimates that one of the two divided regions having more trajectories corresponding to the divided regions is in the foreground.

The following reasons explain why the overlapping relationship information is to be estimated as described above. Of the two divided regions, the one in the background (farther from the camera) has the vicinity of the boarder occluded when the other one in the foreground moves. Hence, compared with the divided region in the foreground, the divided region in the background is likely to show the pixels in the vicinity of the boarder for T frames. Thus, the divided region in the background is likely to have fewer trajectories than the divided region in the foreground. Consequently, the segmentation unit 102 estimates that, of the two divided regions, the divided region having more trajectories extracted from an area within a constant distance from the boundary is located closer to the camera than the other divided region.

Furthermore, in the overlapping relationship estimating step S3025, the segmentation unit 102 outputs the overlapping relationship information as well as the regionally dividing information.

It is noted that the technique to estimate the spatial overlapping relationship between the divided regions in the overlapping relationship estimating step S3025 shall not be defined as it is. Any given technique may be used as far as the technique can estimate the overlapping relationship between the divided regions. For example, the segmentation unit 102 may estimate the overlapping relationship based on an input. Moreover, for example, the segmentation unit 102 may estimate a depth value for each of the pixels based on the degree of the blur in the image, and estimate the overlapping relationship between the divided regions using the estimated depth values.

As described above, the regionally dividing step S302 involves regionally dividing each of the T pictures and generating T items of regionally dividing information through the operation from the trajectory generating step S3021 to the regionally dividing information generating step S3024. Furthermore, the operation in the overlapping relationship estimating step S3025 generates the overlapping relationship information on a region. The segmentation unit 102 repeats the operation in the regionally dividing step S302 so as to regionally divide N pictures (N=300) included in the input video sequence, and generates N items of regionally dividing information and overlapping relationship information.

Figure 8:
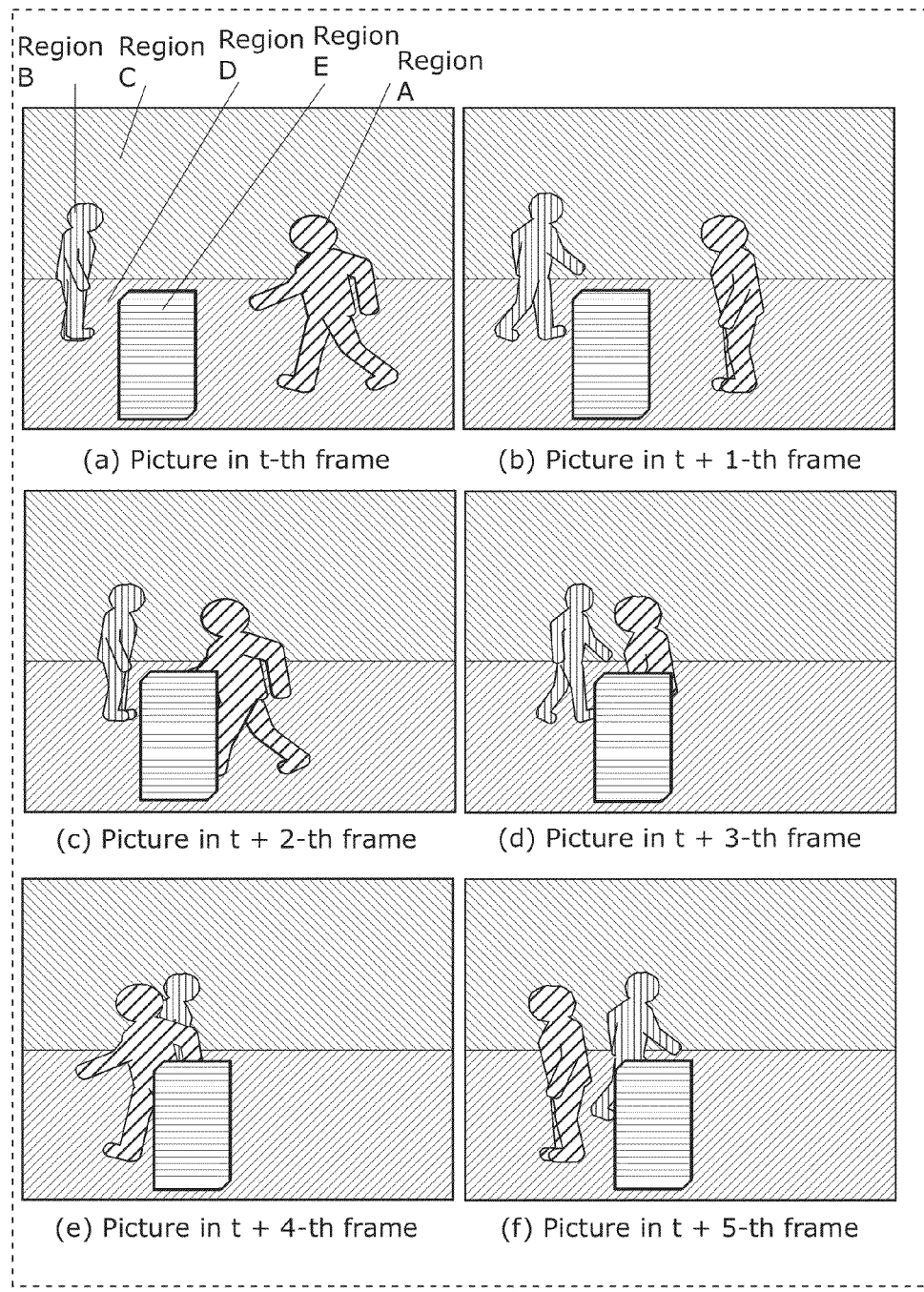
FIG. 8 exemplifies a result of a regional division according to Embodiment 1.

FIG. 8 exemplifies a result of a regional division according to Embodiment 1. Specifically, FIG. 8 illustrates an example of the regionally dividing information obtained by the segmentation unit 102 dividing each of the pictures in FIG. 5 into five divided regions (regions A to E). The illustrations (a) to (f) in FIG. 8 represent data which has the five divided regions (regions A to E) associated with each of the pixels in the pictures illustrated in (a) to (f) in FIG. 5. In other words, the illustrations (a) to (f) in FIG. 8 represent a partial video sequence which is a set of divided regions associated with one another between the pictures.

FIG. 9 exemplifies overlapping relationship information according to Embodiment 1. Specifically, FIG. 9 exemplifies a result of estimating an overlapping relationship between two of the five divided regions obtained by the segmentation unit 102. FIG. 9 exemplifies that the region E is closer to the camera than the regions A, B, and D are. FIG. 9 also exemplifies that the overlapping relationship is unknown "−" between the region E and the region C that is not bordered with the region E.

The regionally dividing information generated by the segmentation unit 102 includes, for example, information on partial video sequences obtained through the division of the input video sequence into regions for each of objects showing a different motion. The regionally dividing information indicates multiple partial video sequences. Hence, the description below may omit distinguishing between the regionally dividing information and the partial video sequences.

Next, the removal region determining step S303 is executed by the removal region determining unit 103. The removal region determining unit 103 determines which region of an object is removed (removal region) from the input video sequence. In Embodiment 1, the removal region determining unit 103 determines, as removal regions, a set of the divided regions included in one of the partial video sequences generated by the segmentation unit 102. Specifically, the removal region determining unit 103 determines the removal region based on, for example, information entered by the user with the mouse and the keyboard.

In other words, based on an input indicating at least one of the objects, the removal region determining unit 103 selects at least one of the partial video sequences and determines, as removal regions, a set of the divided regions included in the selected partial video sequence. Hence, based on the input, the removal region determining unit 103 successfully selects at least one of the partial video sequences and determines, as removal regions, a set of the divided regions included in the selected at least one of the partial video sequences. Thus, if at least one of divided regions is selected in one picture, the removal region determining unit 103 successfully determines a removal region included in an input video sequence. In other words, the user does not have to execute multiple inputs for determining the removal region for multiple pictures, and the removal region determining unit 103 can reduce troublesome operations for the user.

Figure 10:
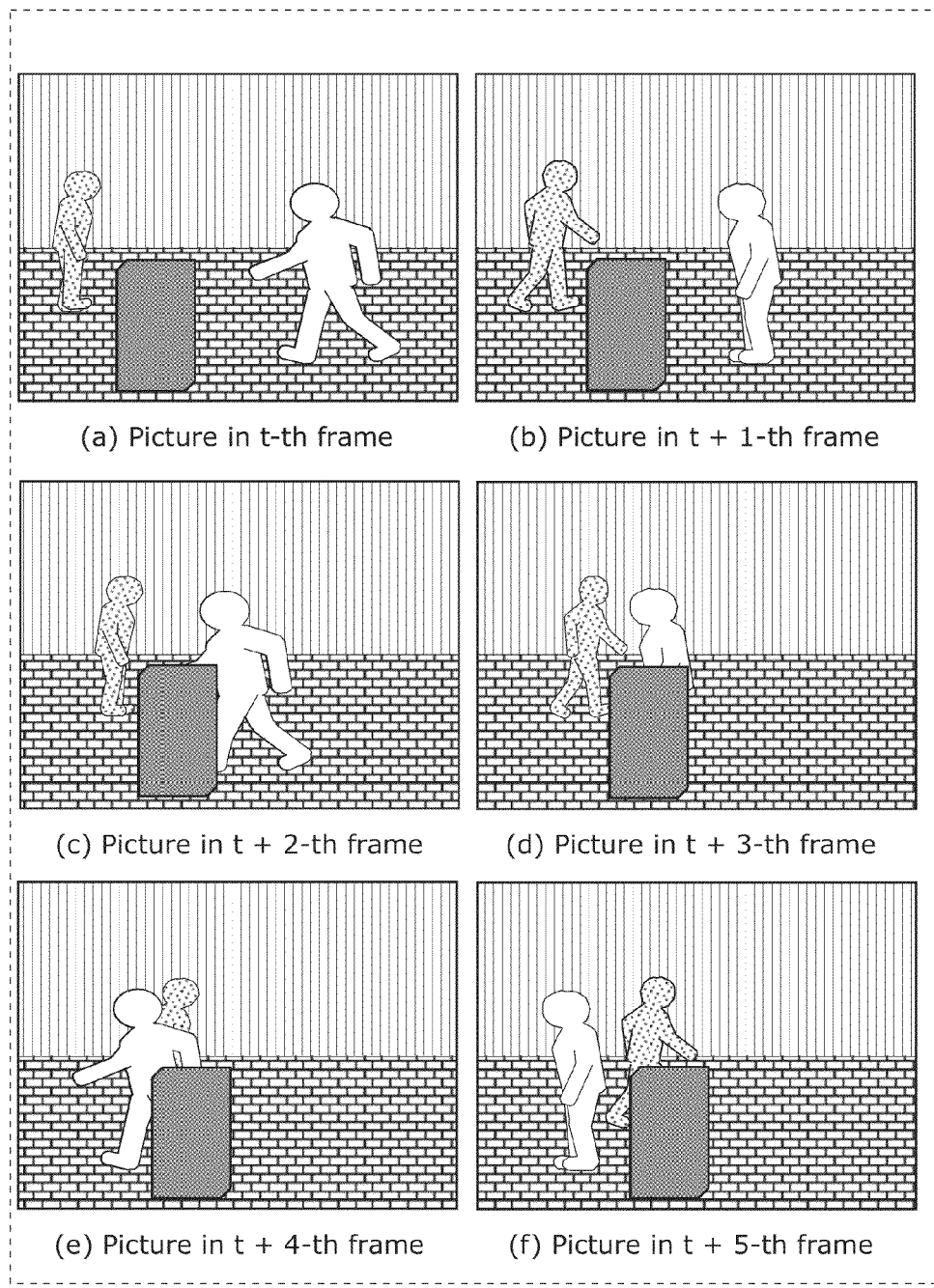
FIG. 10 exemplifies a removal region according to Embodiment 1.
Figure 12:
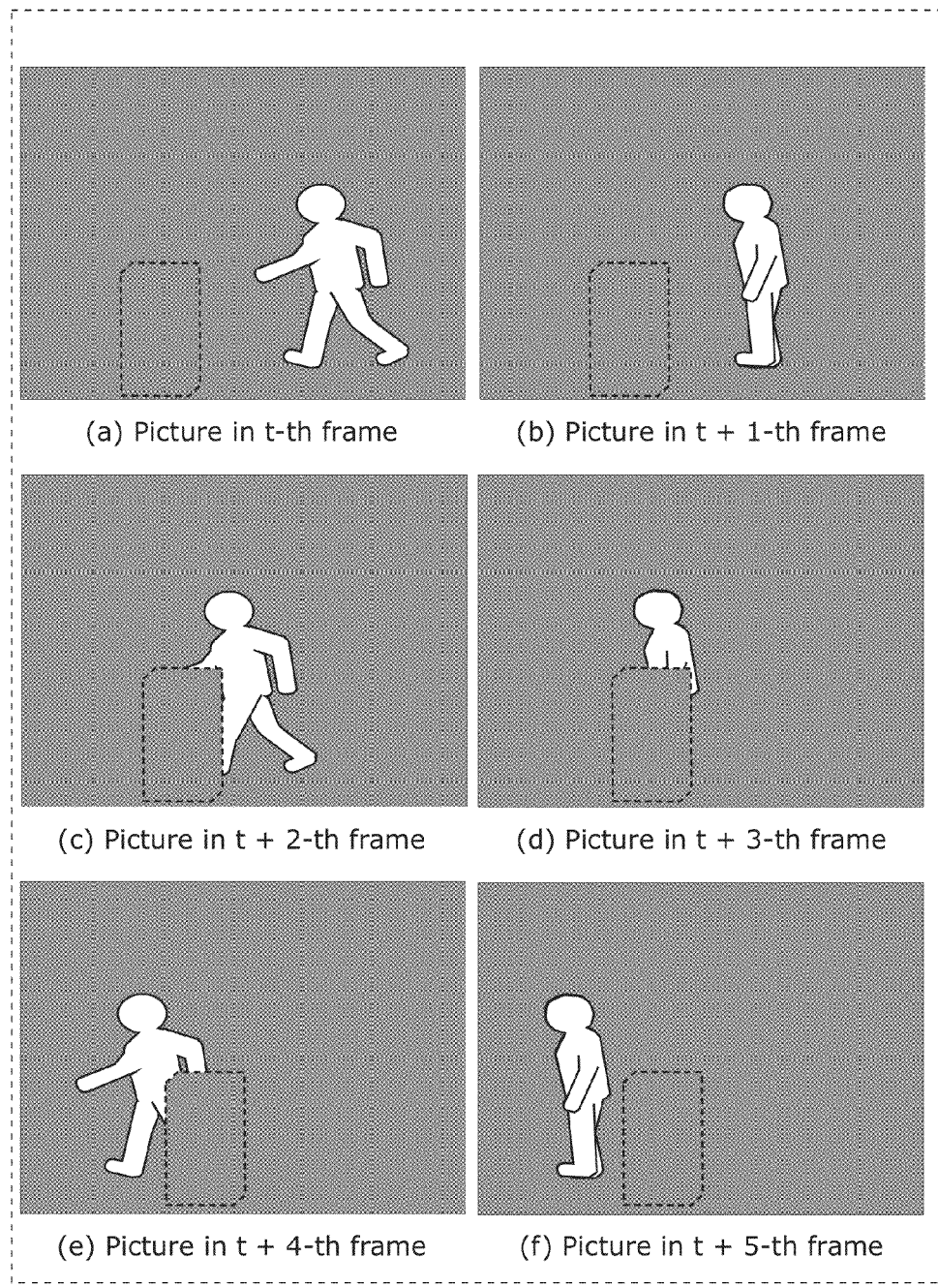
FIG. 12 exemplifies a partial video sequence for a region A according to Embodiment 1.

Described here is the case where user selects the region E out of the five divided regions. FIG. 10 exemplifies a removal region selected by the user. The removal region is the shadowed regions in the illustrations (a) to (f) in FIG. 10.

Next, the completion technique determining step S304 is executed by the completion technique determining unit 104. The completion technique determining unit 104 determines a technique for completing each of partial video sequences, based on the regionally dividing information generated by the segmentation unit 102 and on the removal region determined by the removal region determining unit 103.

FIG. 11 exemplifies a completion technique determining rule according to Embodiment 1. Here, the completion technique includes "Complete" and "Not complete". In other words, the completion technique determining unit 104 determines whether or not to complete an image in an occluded region in each of the partial video sequences, depending on whether or not a divided region included in each of the partial video sequences abuts the removal region.

When a divided region included in a partial video sequence is in contact with a removal region, it means that the divided region and the removal region in the partial video sequence are in contact with each other in any given picture. The regionally dividing information in FIG. 8 and the removal region in FIG. 10 illustrate that the removal region E is in contact with the regions A, B, and D, but is not in contact with region C. Hence, the completion technique determining unit 104 determines "Complete" as the completion technique for partial video sequences each including one of the regions A, B, and D. In contrast, the completion technique determining unit 104 determines "Not Complete" as the completion technique for a partial video sequence including the region C.

The occluded region completing step S305 is executed by the occluded region completing unit 105. According to a completion technique determined by the completion technique determining unit 104, the occluded region completing unit 105 completes, for each of the partial video sequences, an image in an occluded region included in the each of the partial video sequences, and generate completed partial video sequences.

Then, the occluded region completing unit 105 superimposes over one another the completed partial video sequences and the partial video sequences. Here, based on the overlapping relationship estimated by the segmentation unit 102, the occluded region completing unit 105 superimposes over one another the completed partial video sequences and the partial video sequences by sequentially laying a completed partial video sequence and a partial video sequence on top of another completed partial video sequence and another partial video sequence in the order from a completed partial video sequence and a partial video sequence including a divided region in the back (to a completed partial video sequence and a partial video sequence including a divided region in the front).

The space-time completion is the technique used in Embodiment 1 for completing an image in an occluded region. According the space-time completion, an image which matches with the image in the occluded region is assumed to be found at a different time or a different location in the video. Hence, the space-time completion involves searching a different time and location in the video for a region which matches with the occluded region (matching region), and replicates the image in the searched matching region onto the occluded region.

More specifically, for example, the occluded region completing unit 105 sets a space-time window (search target region) for each of the pictures included in a partial video sequence to enclose a divided region (object region) and an occluded region included in the partial video sequence. Next, the occluded region completing unit 105 searches another picture for the matching region having the best matching color and motion with the color and motion in the space-time window. Then, the occluded region completing unit 105 completes the image in the occluded region by replicating an image included in the searched matching region and corresponding to the occluded region onto the occluded region.

In other words, for each of the partial video sequences, the occluded region completing unit 105 searches on each of the pictures that are included in a corresponding one of the partial video sequences, in another picture included in the corresponding one of partial video sequences, for the matching region that matches with the search target region including the occluded region in the each of the pictures. Then, for each of the pictures, the occluded region completing unit 105 replicates the image in the searched matching region onto the occluded region, and completes the image in the occluded region.

The above space-time completion is disclosed in references such as NPL 1, and the details thereof shall be omitted.

Figure 13:
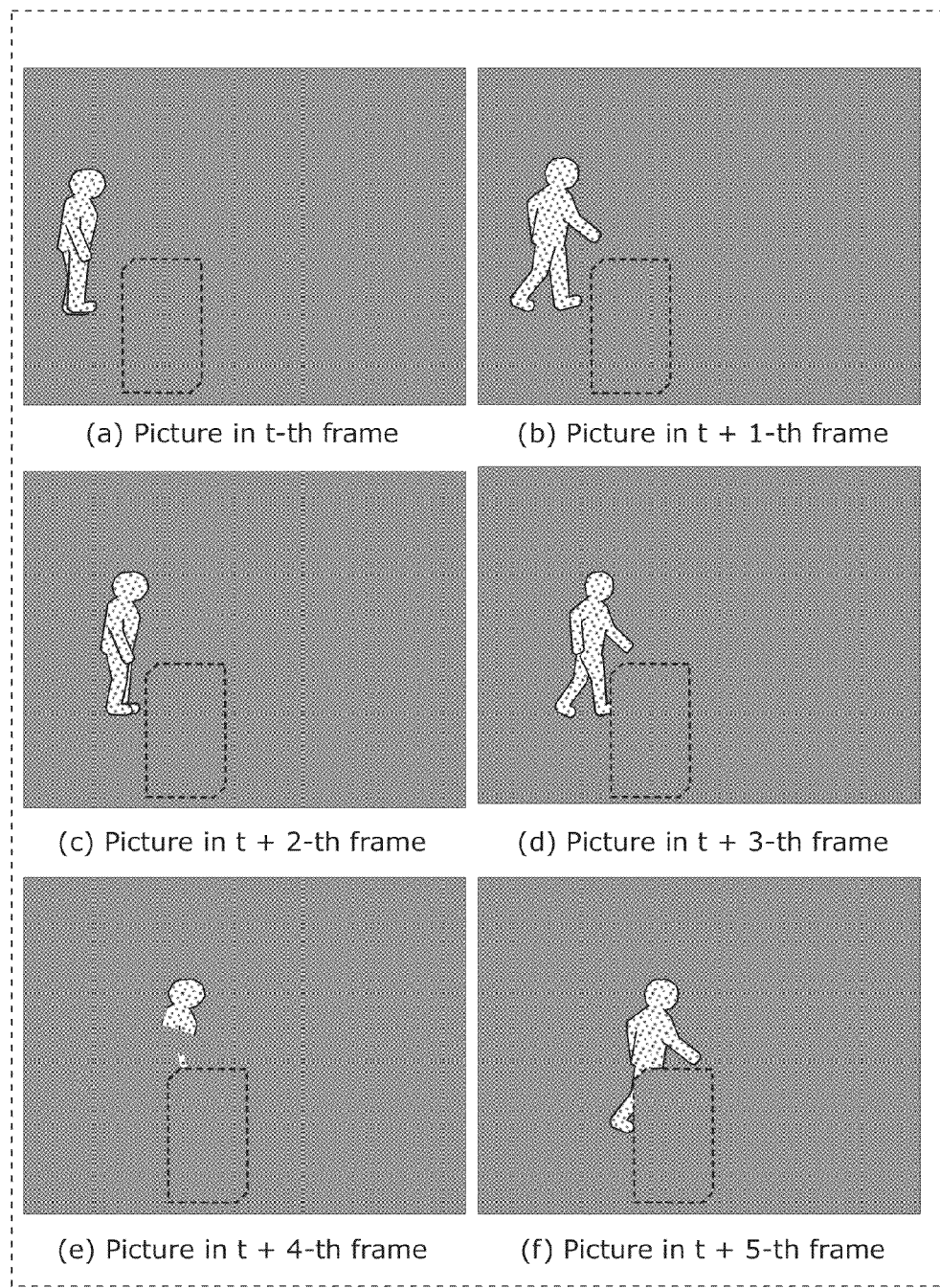
FIG. 13 exemplifies a partial video sequence for a region B according to Embodiment 1.
Figure 14:
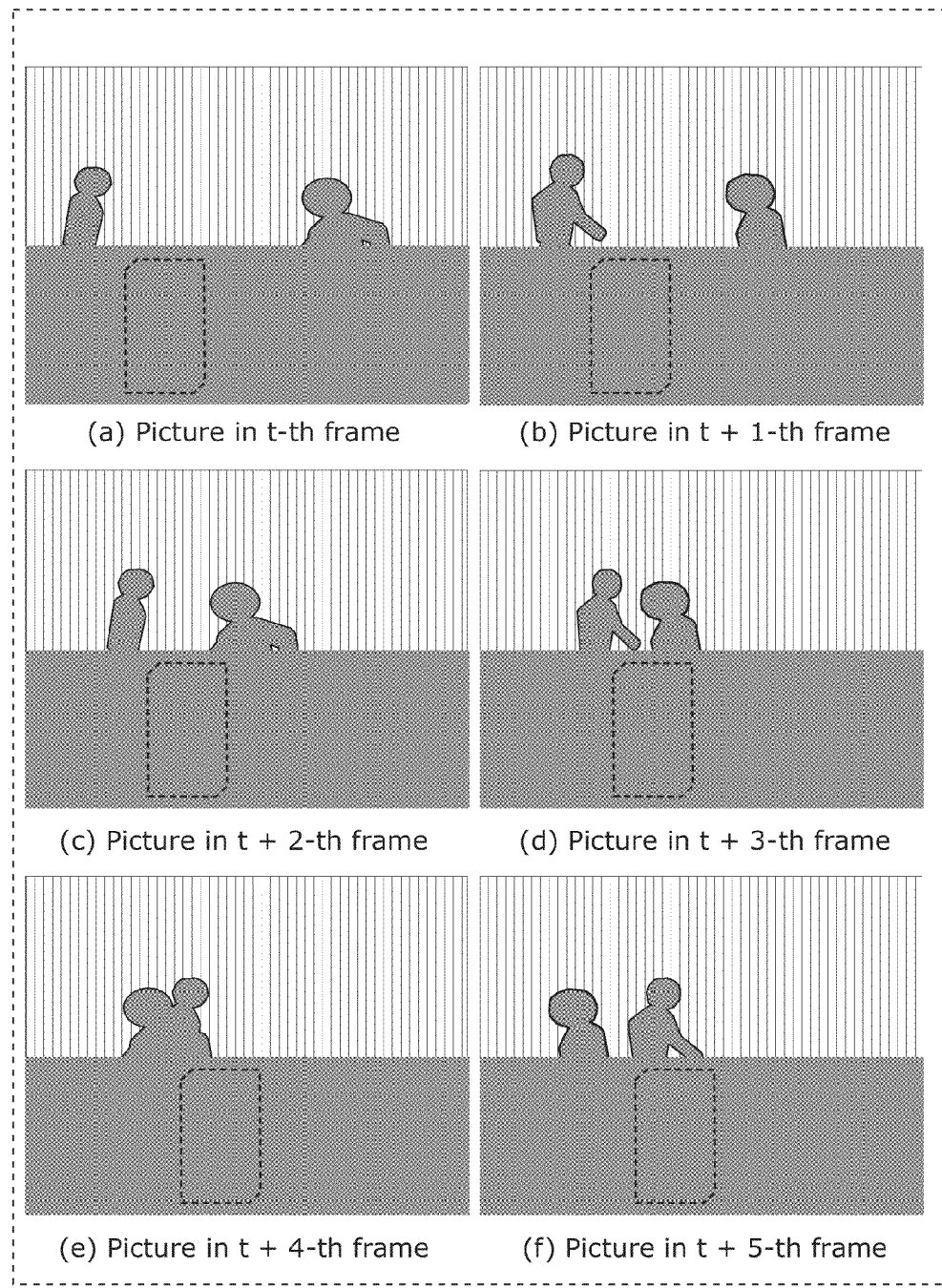
FIG. 14 exemplifies a partial video sequence for a region C according to Embodiment 1.
Figure 15:
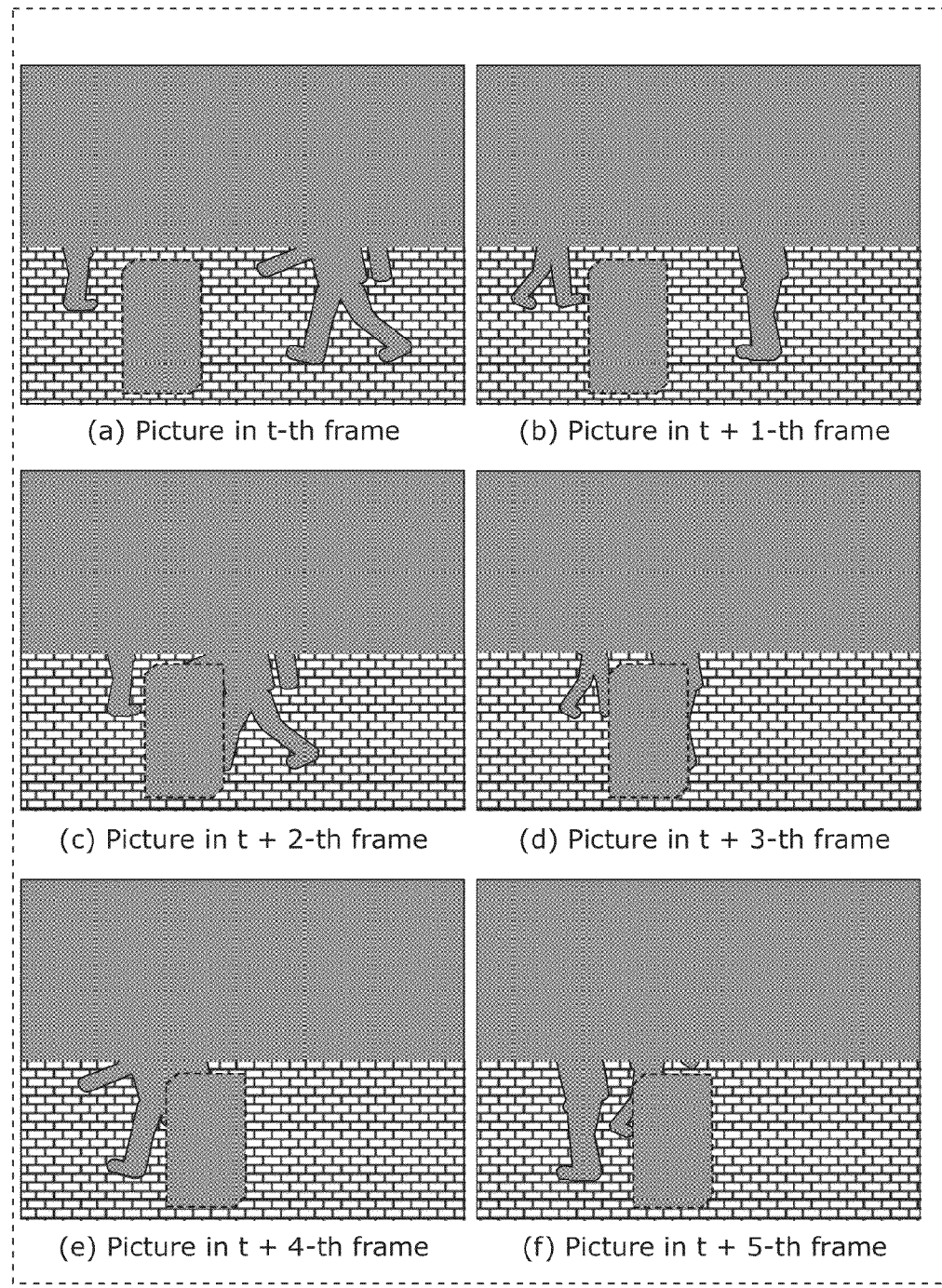
FIG. 15 exemplifies a partial video sequence for a region D according to Embodiment 1.

Described hereinafter is an exemplary operation in the occluded region completing step S305, with reference to FIGS. 12 to 17. FIGS. 12 to 15 exemplify partial video sequences each including one of regions A to D. Specifically, FIG. 12 exemplifies a partial video sequence including the region A. FIG. 13 exemplifies a partial video sequence including the region B. FIG. 14 exemplifies a partial video sequence including the region C. FIG. 15 exemplifies a partial video sequence including the region D.

It is noted that the shadowed region in each of the drawings is a region other than the divided region included in the partial video sequence. In other words, the shadowed region is not included in the partial video sequence. Of the shadowed region, a region enclosed with a white dotted line represents the occluded region.

In the occluded region completing step S305, the occluded region completing unit 105 appropriately completes an image in the occluded region for each of the partial video sequences, and generates completed video sequences. Each of the completed video sequence is a video sequence with a removal region removed. Specifically, according to a completion technique determined by the completion technique determining unit 104, the occluded region completing unit 105 completes the image in the occluded region for each of the partial video sequences including one of the regions A, B, and D.

It is noted that, in Embodiment 1, the occluded region completing unit 105 does not complete an image in the occluded region for the partial video sequence including the region C. In other words, the occluded region completing unit 105 completes an image in the occluded region only for a partial video sequence including a divided region which abuts the removal region. Here, the partial video sequence is included in the multiple partial video sequences and the divided region is included in the multiple divided regions. Hence, the occluded region completing unit 105 can omit the completion processing for a partial video sequence which does not include the divided region that abuts the removal region. Such a feature contributes to reducing processing load and time.

Figure 16:
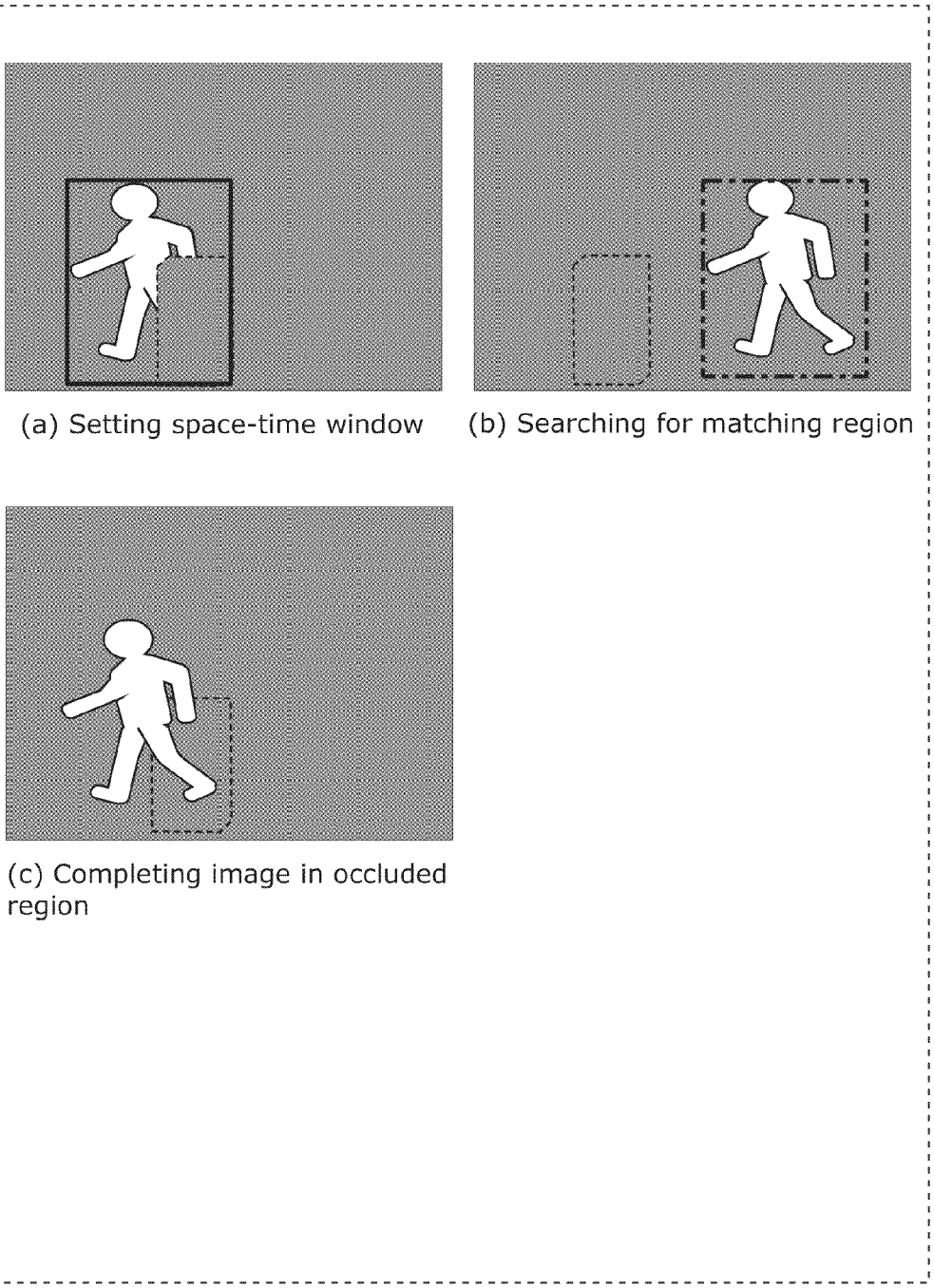
FIG. 16 illustrates an operation in an occluded region completing step according to Embodiment 1.

FIG. 16 illustrates a sequence in the occluded region completing step S305 of completing an image in an occluded region in one picture. The illustration (a) in FIG. 16 represents a picture (the same picture as the one in illustration (e) in FIG. 12) included in the partial video sequence for the region A. In the illustration (a) in FIG. 16, the rectangular region enclosed with a white solid line exemplifies a space-time window (search target region) enclosing the region A (object region) and the occluded region. The occluded region completing step S305 involves searching another picture included in the same partial video sequence for the matching region having the best matching color and motion with the color and motion in the space-time window.

The illustration (b) in FIG. 16 exemplifies a matching region searched for in another picture. The example indicates that the picture in the illustration (b) in FIG. 16 is the same as the one in the illustration (a) in FIG. 12. The rectangular region enclosed with a white dashed-dotted line in the illustration (b) is a matching region which is searched for as the best matching region with the space-time window in the illustration (a) in FIG. 16.

The illustration (c) in FIG. 16 represents a picture in which the image in the matching region in the illustration (b) in FIG. 16 is replicated onto the occluded region in the illustration (a) in FIG. 16. The occluded region completing step S305 involves executing the above completion processing on the occluded region, which is included in each of the pictures, for the partial video sequences each including one of the regions A, B, and D, and generating completed partial video sequences each having the image in the occluded region completed.

Figure 17:
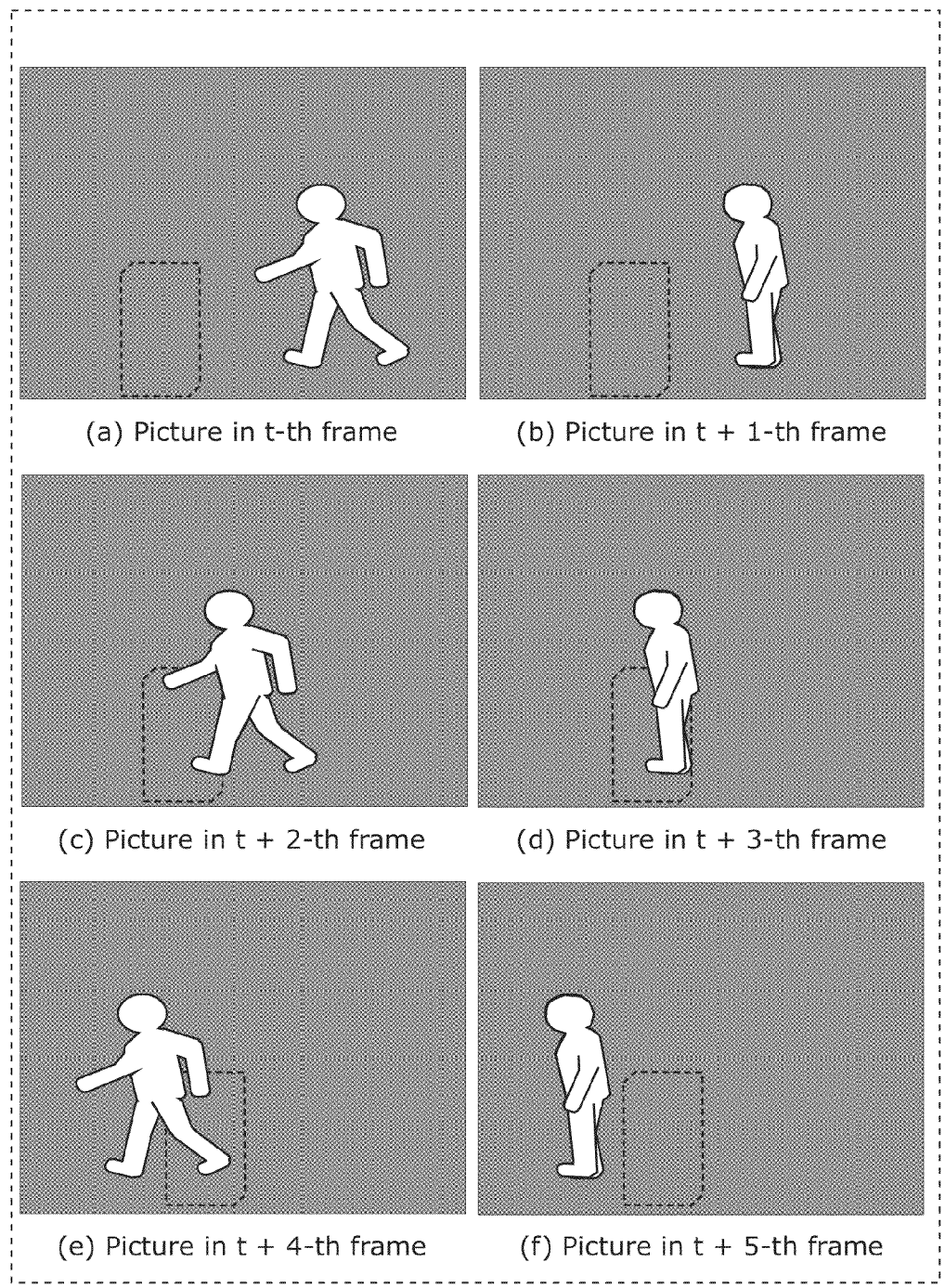
FIG. 17 exemplifies a completed partial video sequence for the region A according to Embodiment 1.
Figure 18:
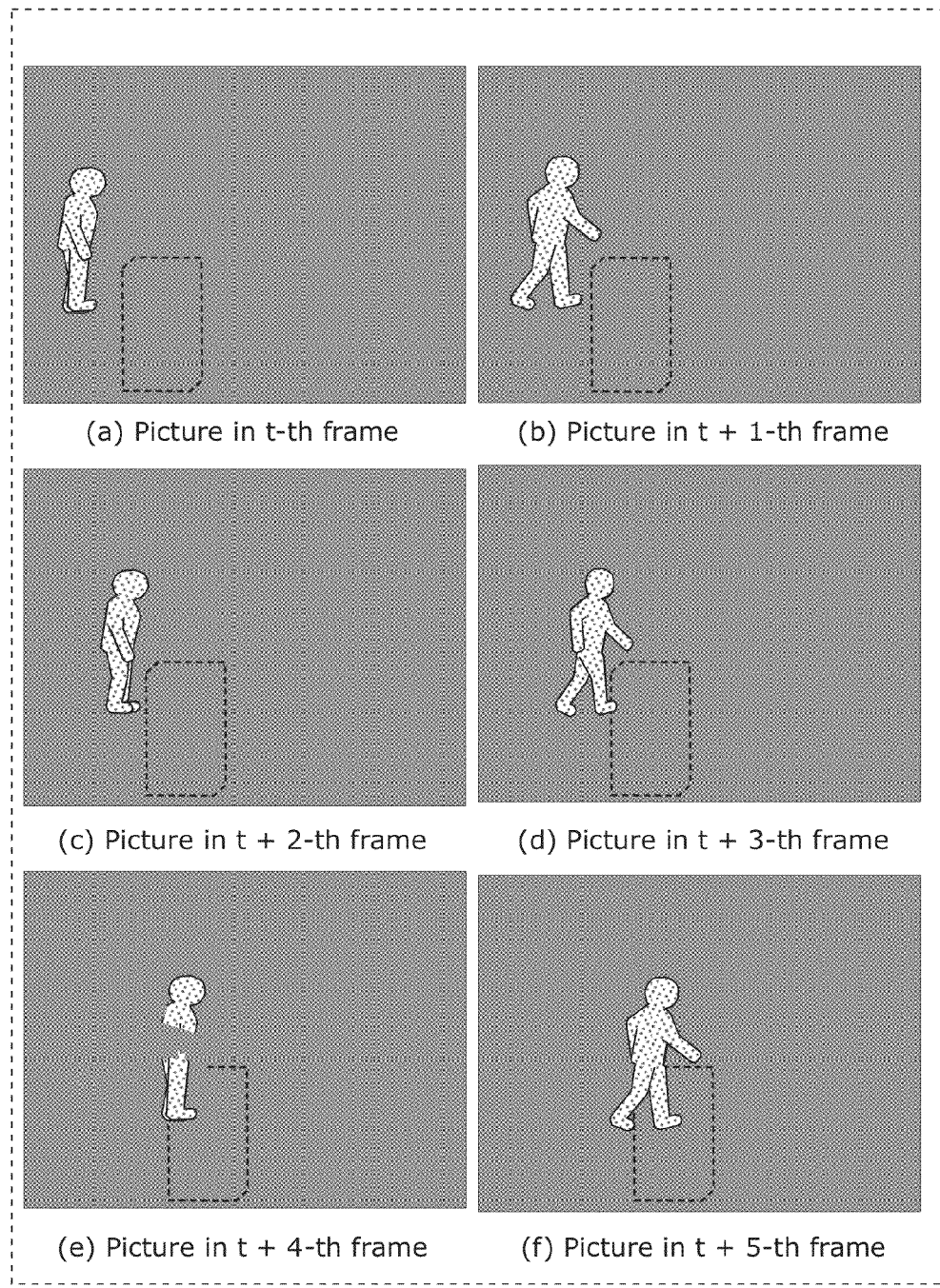
FIG. 18 exemplifies a completed partial video sequence for the region B according to Embodiment 1.
Figure 19:
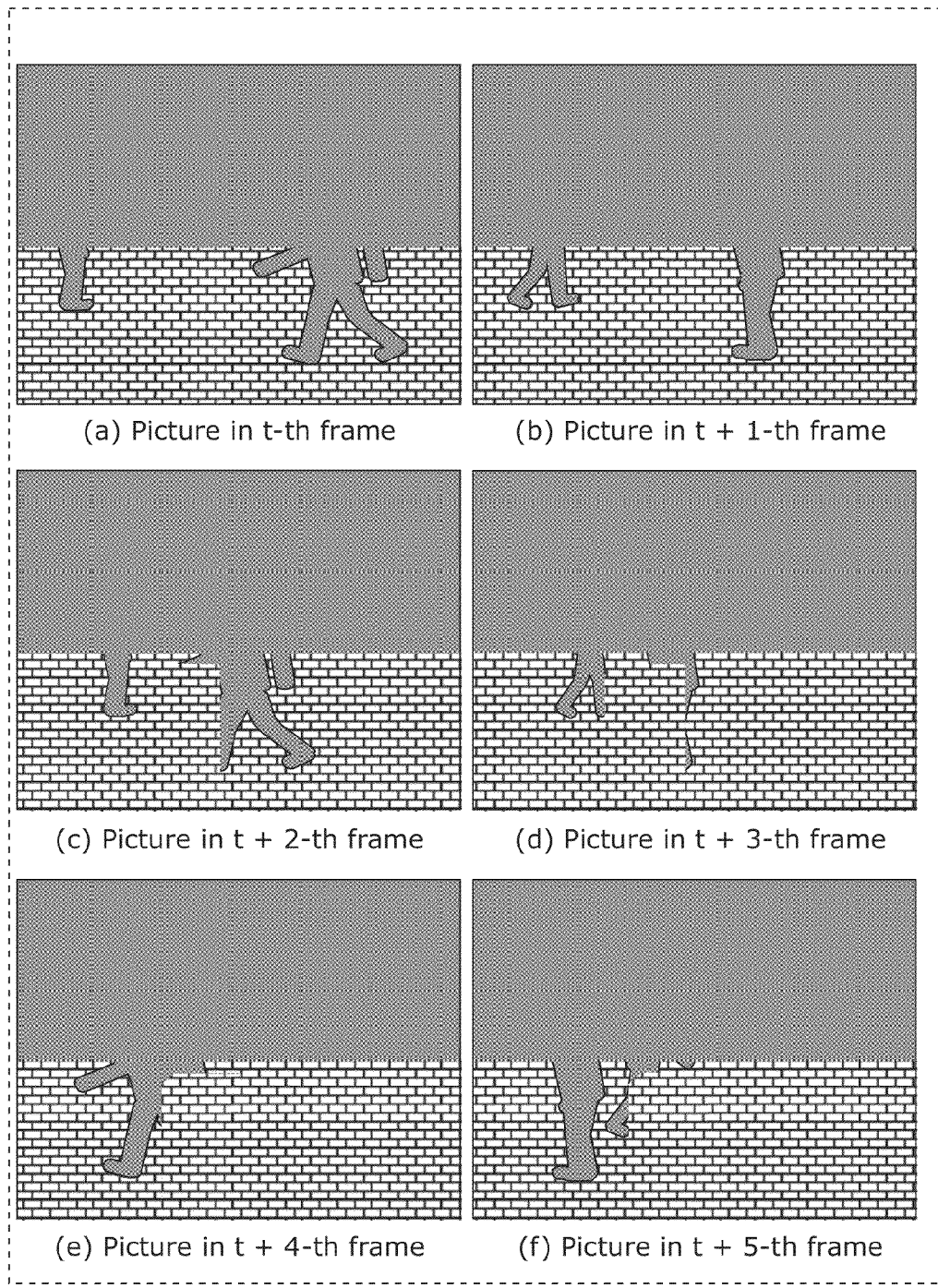
FIG. 19 exemplifies a completed partial video sequence for the region D according to Embodiment 1.

FIGS. 17 to 19 illustrate results of completing images in the occluded region for the partial video sequences (FIGS. 12, 13, and 15) each including one of the regions A, B, and D. In other words, FIGS. 17 to 19 illustrate completed partial video sequences for the regions A, B, and D.

Figure 20:
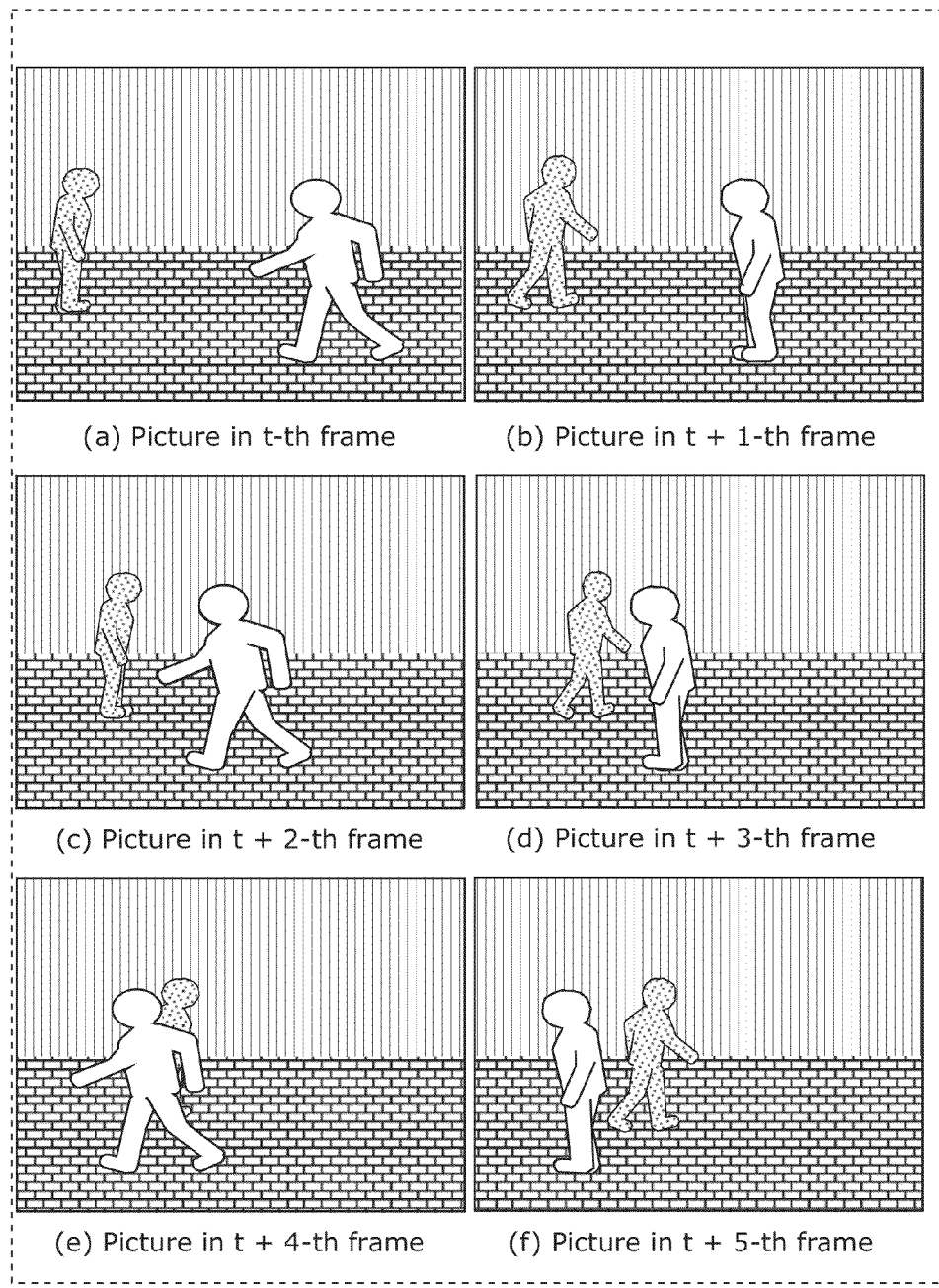
FIG. 20 exemplifies a completed video sequence according to Embodiment 1.

FIG. 20 exemplifies a completed video sequence generated by superimposing over one another the completed partial video sequences (FIGS. 17 to 19) for the regions A, B, and D, and the partial video sequence (FIG. 14) for the region C. As illustrated in FIG. 20, the occluded region completing unit 105 superimposes over one another partial video sequences which are included in the multiple partial video sequences but not including the partial video sequence having the removal region. Here, the superimposed partial video sequences include the completed partial video sequences and the non-completed partial video sequence.

Figure 21:
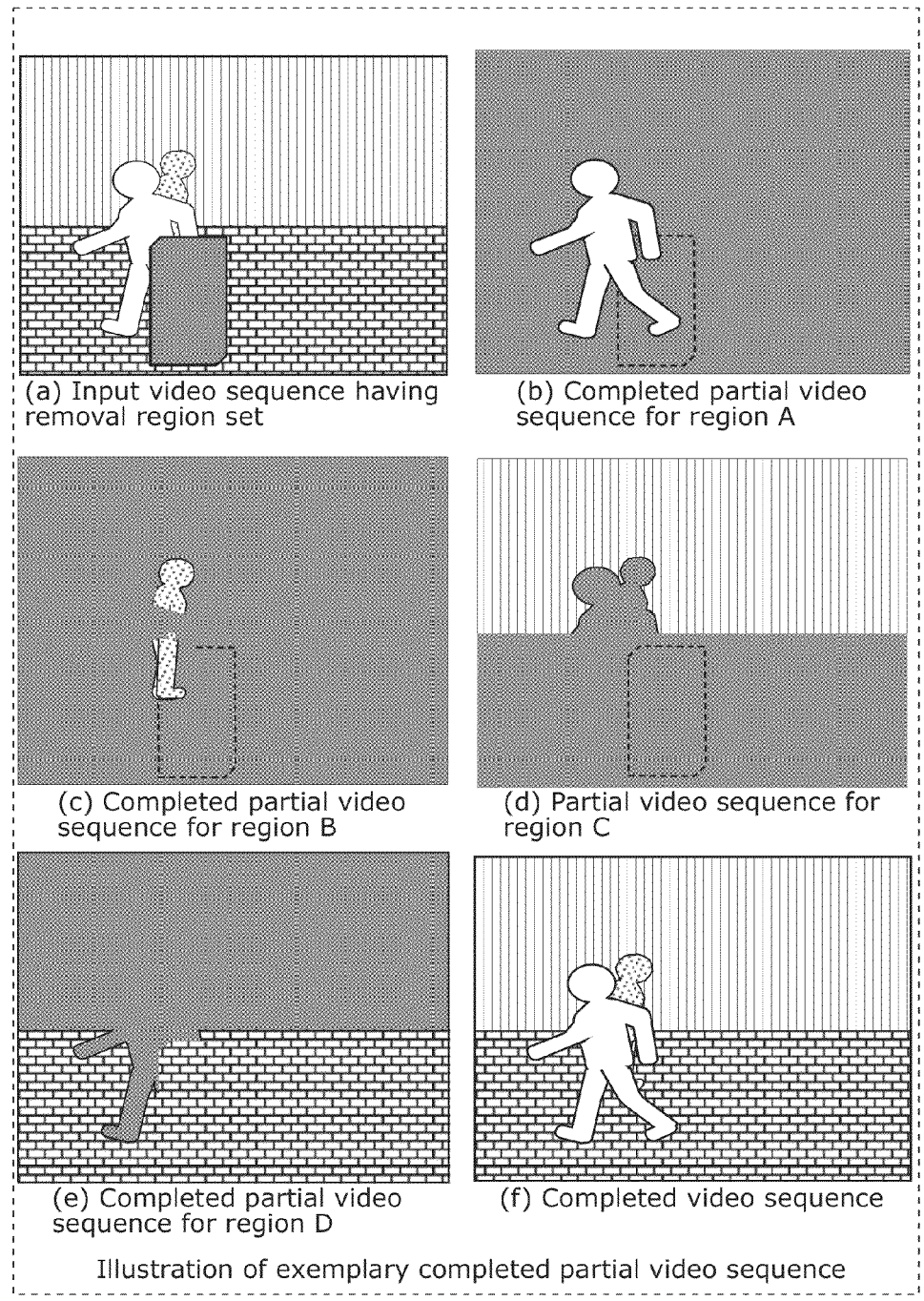
FIG. 21 exemplifies a completed partial video sequence according to Embodiment 1.

FIG. 21 illustrates pictures, of the t+4-th frame, each included in one of the partial video sequences. The illustration (a) in FIG. 21 exemplifies a picture, of the t+4-th frame, included in the input video sequence. The illustrations (b), (c), and (e) exemplifies pictures, of the t+4-th frame, each included in one of the completed partial video sequences for the regions A, B, and D. The illustration (d) in FIG. 21 exemplifies a picture, of the t+4-th frame, included in the partial video sequence for the region C. The illustration (f) in FIG. 21 exemplifies a picture, of the t+4-th frame, included in the completed video sequence.

The illustration (a) in FIG. 21 represents that three different objects are occluded by the removal target object. In completing an image when multiple dynamic objects are occluded by the removal region, a conventional technique faces a difficulty in appropriately completing the image.

For example, the technique disclosed in NPL 1 involves setting a space-time window around the removal region in the illustration (a) in FIG. 21, and searching another picture for the best matching region with the space-time window. In the removal region, however, a temporal change in the positional relationship is observed between the dynamic objects occluded by the removal target object. Hence, in the removal region included in a picture of a certain time, it is highly improbable that another picture has an image matching with the image of the objects occluded by the removal target object. As a result, the conventional technique fails to appropriately complete the image when removing the removal target object occluding the dynamic objects. This is obvious from the fact that each of the pictures in the illustrations (a) to (f) in FIG. 10 does not have any regions matching with a region in the vicinity of the removal region (shadowed region) in the illustration (a) in FIG. 21.

In Embodiment 1, in contrast, the segmentation unit 102 divides the input video sequence into five partial video sequences each including one of the regions A to E. Then, for each of the partial video sequences (except for the partial video sequence including the region E (removal region)), the occluded region completing unit 105 completes an image in the occluded region. The partial video sequence divided for each object is likely to have a region, which matches with the occluded region, in another picture in the partial video sequence itself. In the case of the divided regions including walking people, such as the regions A and B, the divided regions are expected to represent motions indicating periodical postural changes by the walk. In other words, a region which matches with a picture in one frame is high likely to appear in another picture. Moreover, also in the case of the divided region including a still background, such as the region D, a region which matches with a picture in one frame is highly likely to appear in another picture. Hence, the video generating apparatus 100 according to Embodiment 1 completes an image in the occluded region for each of the partial video sequences, so that the resulting images in the occluded region are appropriately completed as seen in the illustration (f) in FIG. 21.

Finally, the video outputting step S306 is executed by the video outputting unit 106. The video outputting unit 106 outputs the generated completed video sequence to the display 120.

As described above, the segmentation unit 102 divides an input video sequence into multiple partial video sequences (such as partial video sequences each for an object). Then, for each of the partial video sequences, the occluded region completing unit 105 completes an image in the occluded region, thereby completing the partial video sequences. Furthermore, the occluded region completing unit 105 generates a completed video sequence by superimposing the completed partial video sequences over one another.

Hence, the video generating apparatus 100 can appropriately complete images including multiple dynamic objects and generate a completed video sequence, even if the dynamic objects are occluded by a removal target object in a removal region. In other words, the video generating apparatus 100 can generate a completed video sequence which appears as if the removal target object did not exist from the beginning.

In other words, for each of partial video sequences, the occluded region completing unit 105 completes an image in the occluded region. Hence, the occluded region completing unit 105 can complete an image in the occluded region for each of the partial video sequences, thereby completing the partial video sequences. Here, each of the partial video sequences corresponds to one of dynamic objects, even if the dynamic objects are occluded in a removal region by a removal target object. In other words, the occluded region completing unit 105 can complete an image in the occluded region for, for example, each of multiple dynamic objects regardless of the positional relationship between the dynamic objects, so that the resulting image in the occluded region is appropriately completed.

Furthermore, the occluded region completing unit 105 can generate a completed video sequence by superimposing the above-described completed multiple partial video sequences over one another. Hence, the occluded region completing unit 105 can reflect, in the completed video sequence, the positional relationship between multiple dynamic objects, and the resulting completed video sequence is appropriately generated to adapt the positional relationship between the dynamic objects.

In Embodiment 1, the completion technique determining unit 104 selects a partial video sequence in which an image in the occluded region is to be completed, depending on whether or not a region included in the partial video sequence abuts the occluded region. Then, only for the selected partial video sequence, the occluded region completing unit 105 completes the image in the occluded region.

Such a feature allows the completion on an image in the occluded region to be executed only in the selected partial video sequence, which contributes to reducing the amount and time of calculation required for the completion.

It is noted that the occluded region completing unit 105 does not have to complete an image in the occluded region for all the pictures included in a partial video sequence including a divided region which abuts a removal region. In other words, for example, the occluded region completing unit 105 may complete the image in the occluded region only for a picture including the divided region that abuts the removal region. Here, the picture is included in multiple pictures in a partial video sequence including the divided region abutting the removal region. Hence, the occluded region completing unit 105 can omit completing a picture which does not include the divided region that abuts the removal region. Such a feature contributes to reducing processing load and time.

Moreover, in Embodiment 1, the removal region determining unit 103 selects at least one of multiple partial video sequences based on an input, and determines, as a removal region, at least one set of the divided regions included in the selected partial video sequence. A conventional technique requires the user to cost excessive efforts (such as specifying with a mouse an object region to be removed through multiple frames in a video sequence) to determine the removal region. In Embodiment 1, however, the user simply selects a partial video sequence which corresponds to the removal target object. Hence, the removal region determining unit 103 can reduce such user's efforts.

Embodiment 2

Prior to describing Embodiment 2, described first are completion techniques other than the space-time completion.

Another technique to complete an image in an occluded region is to generate a static background image. The generation of a static background image involves completing an image in an occluded region on the assumption that the removal target object is dynamic and the occluded object is static (see PTL 2 (Japanese Unexamined Patent Application Publication No. 2001-155163), for example).

PTL 2 discloses extraction of a luminance value having high frequency from among temporally-changing luminance values for each of the pixels in the input video sequence. Then, based on the extracted luminance value, a static background image is generated. Then, the generated static background image is replicated onto the occluded region to complete the image in the occluded region. The technique to generate a static background image makes it possible to appropriately complete an image in the occluded region in the case where the occluded object is static and the removal target object is dynamic. For example, out of an input video sequence obtained with a static camera, the technique makes it possible to generate video which appears as if the removal target object did not exist from the beginning.

Still another technique to complete an image in an occluded region is to generate a mosaic image. The technique to generate a mosaic image is to complete an image in the occluded region on the assumption that the background including the occluded object is shifting in parallel. Specifically, the technique generates a mosaic image by collecting regions of an object which is shifting in parallel in the video, and replicates the generated mosaic image onto the occluded region (see PTL 3 (Japanese Unexamined Patent Application Publication No. 09-130803), for example).

In PTL 3, the technique involves completing an image in the occluded region on the assumption that the background including the occluded object is uniformly dynamic. Specifically, the technique completes a pixel value of the occluded region based on pictures which precede and succeed a picture including the occluded region, using a motion in the vicinity of the occluded region. The generation of a mosaic image can appropriately complete an image in the occluded region, in the case where the camera shifts in parallel so that the angle between the imaging area of the camera and the background plane is formed constant and the removal target object shifts with respect to the background.

Another technique to complete an image in the occluded region is to complete the image by separating a still image from a dynamic image. The completion of an image by separating a still image from a dynamic image involves completing the image in the occluded region on the assumption that an occluded object includes a dynamic foreground and a still background. Specifically, the technique involves completing the image in the occluded region through a combination of (i) a completion of an image in a dynamic region included in the occluded region and (ii) a completion of an image in a static region (see, for example, NPL 3 (Tatsuya Yatagawa and Yasushi Yamaguchi, "Dynamic Background Removal for Video Inpainting", The Special Interest Group Technical Reports of Information Processing Society of Japan, Vol. 2011-CVIM-179, No. 8), and NPL 4 (K. A. Patwardhan, Guillermo Sapiro, and Marcelo Bertalmio, "Video Inpainting Under Constrained Camera Motion", IEEE Trans. on Image Processing, Vol. 16, No. 2, Feb. 2007)).

The technique in NPLs 3 and 4 involves dividing an input video sequence into a dynamic region and static region. Then, for the dynamic region, the technique searches a picture in a video sequence for a region matching the occluded region, and completes an image in the occluded region using the image in the matching region that has been searched for. For the static region, the technique generates a static background image and completes the image in the occluded region. The technique can appropriately complete an image in the occluded region by dividing an input video sequence into a static region and a dynamic region and completing the image in the occluded region for each of the static region and the dynamic region using a different scheme.

The above-disclosed techniques involve completing an image in the occluded region using a certain scheme regardless of the condition of an occluded region. Specifically, the techniques utilizes a certain scheme to complete an image in the occluded region on the assumption that the occlude object satisfies a certain condition.

The condition of the occluded region is not always constant; however, and the image in the occluded region might not be appropriately completed, depending on the condition of the occluded region. The techniques to generate a static background image and to generate a mosaic image taught in NPLs 2 and 3, for example, cannot appropriately complete an image in the occluded region in the case where the occluded object is a dynamic object, such as a person.

Hence, a video generating apparatus according to Embodiment 2 determines an appropriate completion technique from among multiple completion techniques, depending on the condition of a divided region included in a partial video sequence.

Described hereinafter is Embodiment 2 with reference to the drawings.

<Functional Structure of Video Generating Apparatus 150>

Figure 22:
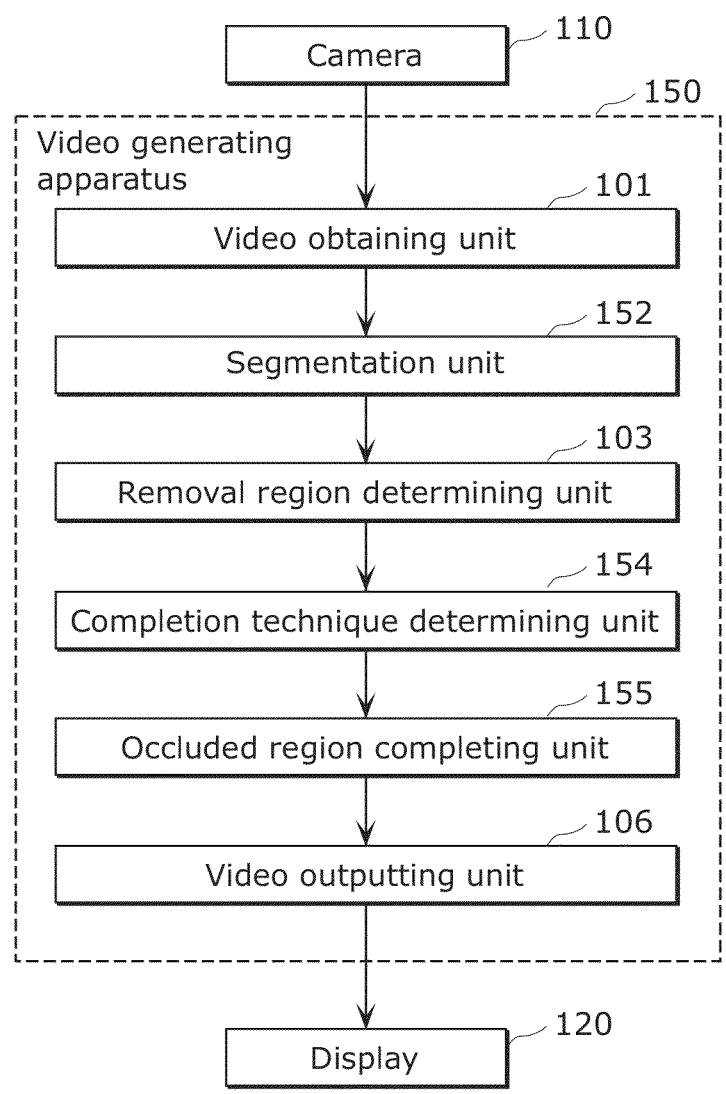
FIG. 22 illustrates a functional structure of a video generating apparatus according to Embodiment 2.

FIG. 22 illustrates a functional structure of a video generating apparatus 150 according to Embodiment 2. In Embodiment 2, the video generating apparatus 150 includes the video obtaining unit 101, a segmentation unit 152, the removal region determining unit 103, a completion technique determining unit 154, and an occluded region completing unit 155.

<Segmentation Unit 152>

Similar to the segmentation unit 102 in Embodiment 1, the segmentation unit 152 generates multiple partial video sequences. Furthermore, in Embodiment 2, the segmentation unit 152 estimates motion information on each of sets of the divided regions. The motion information indicates a motion in each divided region.

In Embodiment 2, the motion information includes information indicating whether or not each of sets of divided regions presents an articulated motion. The articulated motion is a motion of an articulated object, such as a human, a cat, and a dog.

In Embodiment 2, the motion information includes information indicating whether or not each of sets of the divided regions presents a rigid motion. The rigid motion means a motion of an object which does not significantly alter by moving, such as a car, a train, and an airplane.

In Embodiment 2, the motion information includes information indicating whether or not each of sets of the divided regions is in a static state. It is noted that the divided region in a static state includes a divided region presenting a motion smaller than a predetermined motion, as well as a divided region presenting a complete stop.

<Completion Technique Determining Unit 154>

The completion technique determining unit 154 determines a technique for completing each of the partial video sequences, based on the estimated motion information for each of the divided regions. In other words, for each partial video sequence, the completion technique determining unit 154 determines, as the completion technique for the partial video sequence, a completion technique based on the motion information on a region included in the partial video sequence.

In Embodiment 2, if the estimation indicates that an articulated motion is presented in a set of the divided regions of a first partial video sequence, the completion technique determining unit 154 determines a first completion technique, which is based on periodicity of the articulated motion, for completing the first partial video sequence. In Embodiment 2, if the estimation indicates that a rigid motion is presented in a set of the divided regions of a second partial video sequence, the completion technique determining unit 154 determines a second completion technique, which is different from the first completion technique and based on a characteristic of the rigid motion, for completing the second partial video sequence. Furthermore, if estimation indicates that a static state is presented in a set of the divided regions of a third partial video sequence, the completion technique determining unit 154 determines a third completion technique, which is different from both the first completion technique and the second completion technique and is based on a feature of a static object, as a technique for completing the third partial video sequence.

<Occluded Region Completing Unit 155>

According to a determined completion technique, the occluded region completing unit 155 completes an image in the occluded region for each of the partial video sequences. If the determination indicates that the first completion technique is for completing the first partial video sequence, the occluded region completing unit 155, on each of pictures included in the first partial video sequence, (a) searches an other picture included in the first partial video sequence for a matching region which matches with a search target region including the occluded region in the picture, and (b) completes the image in the occluded region by replicating the image in the matching region onto the occluded region.

<Operation of Video Generating Apparatus 150>

Described hereinafter is an operation of the video generating apparatus 150 according to Embodiment 2, with reference to FIG. 23.

Figure 23:
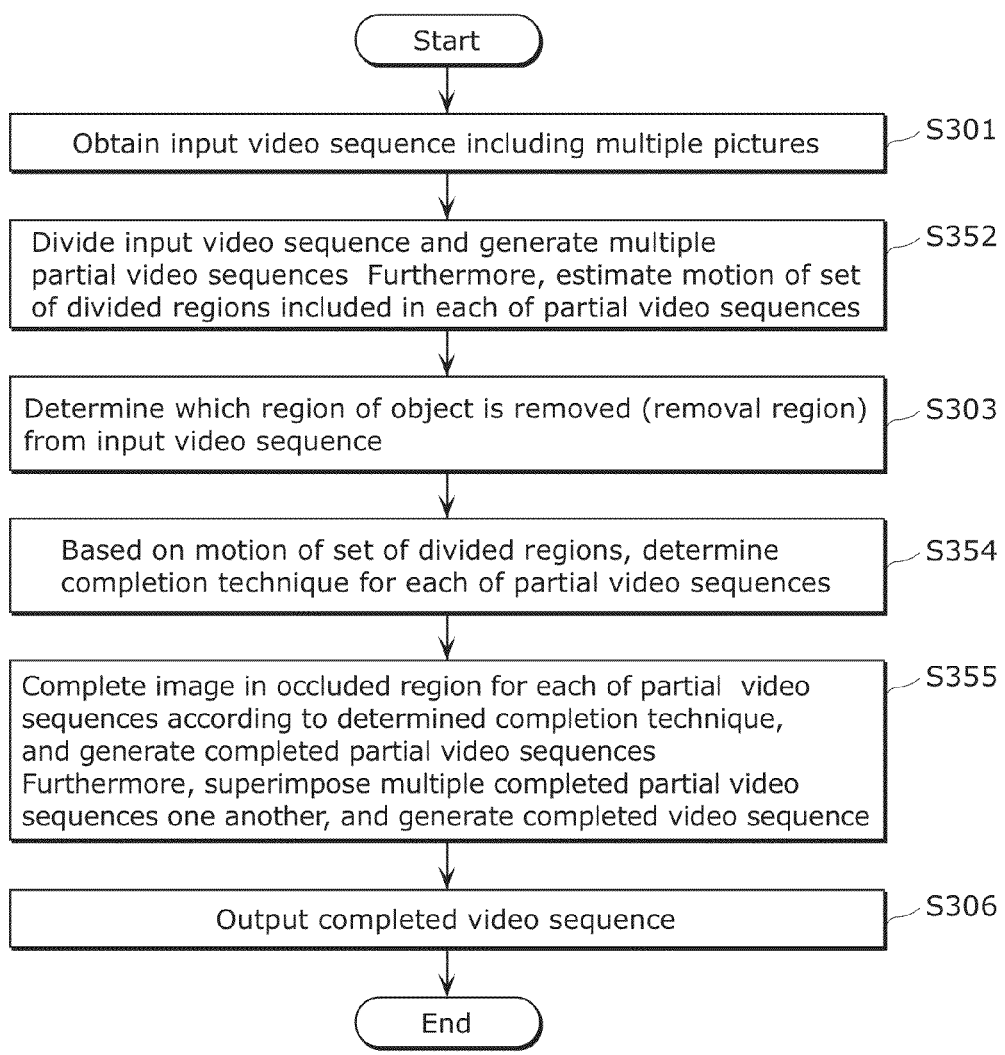
FIG. 23 depicts a flowchart representing an operation of the video generating apparatus according to Embodiment 2.

FIG. 23 depicts a flowchart representing an operation of the video generating apparatus according to Embodiment 2. The six steps S301, S352, S303, S354, S355, and S306 respectively correspond to the units 100, 152, 103, 154, 155, and 106 in FIG. 22.

First, in the video obtaining step S301, the video obtaining unit 101 obtains from the camera 110 multiple pictures included in an input video sequence.

Figure 25:
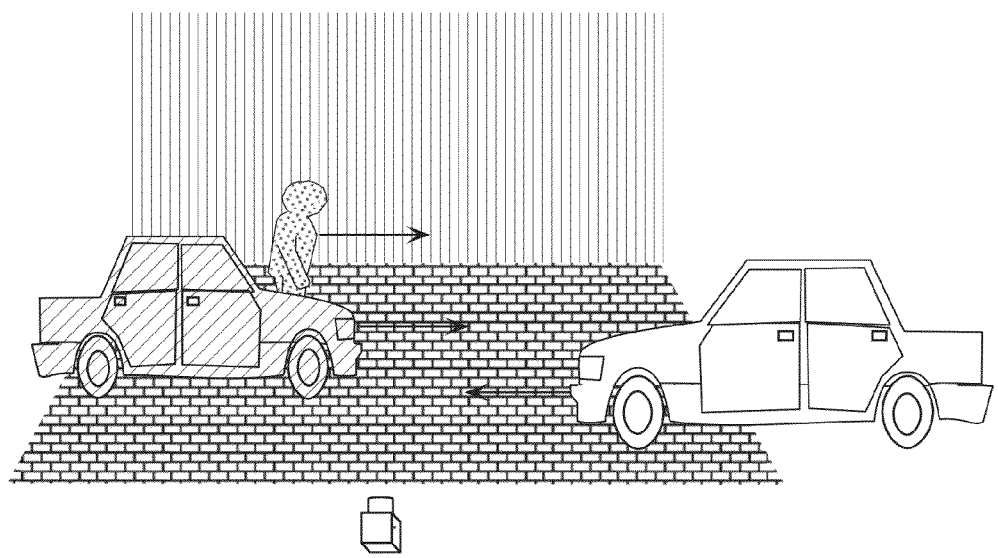
FIG. 25 exemplifies how a video sequence is captured according to Embodiment 2.

FIG. 25 exemplifies how a video sequence is captured according to Embodiment 2. Embodiment 2 describes how the video generating apparatus 150 operates, using, as an exemplary input video sequence, a video sequence which is obtained by the video generating apparatus 150 staying still and shows one person walking and two cars running.

Figure 26:
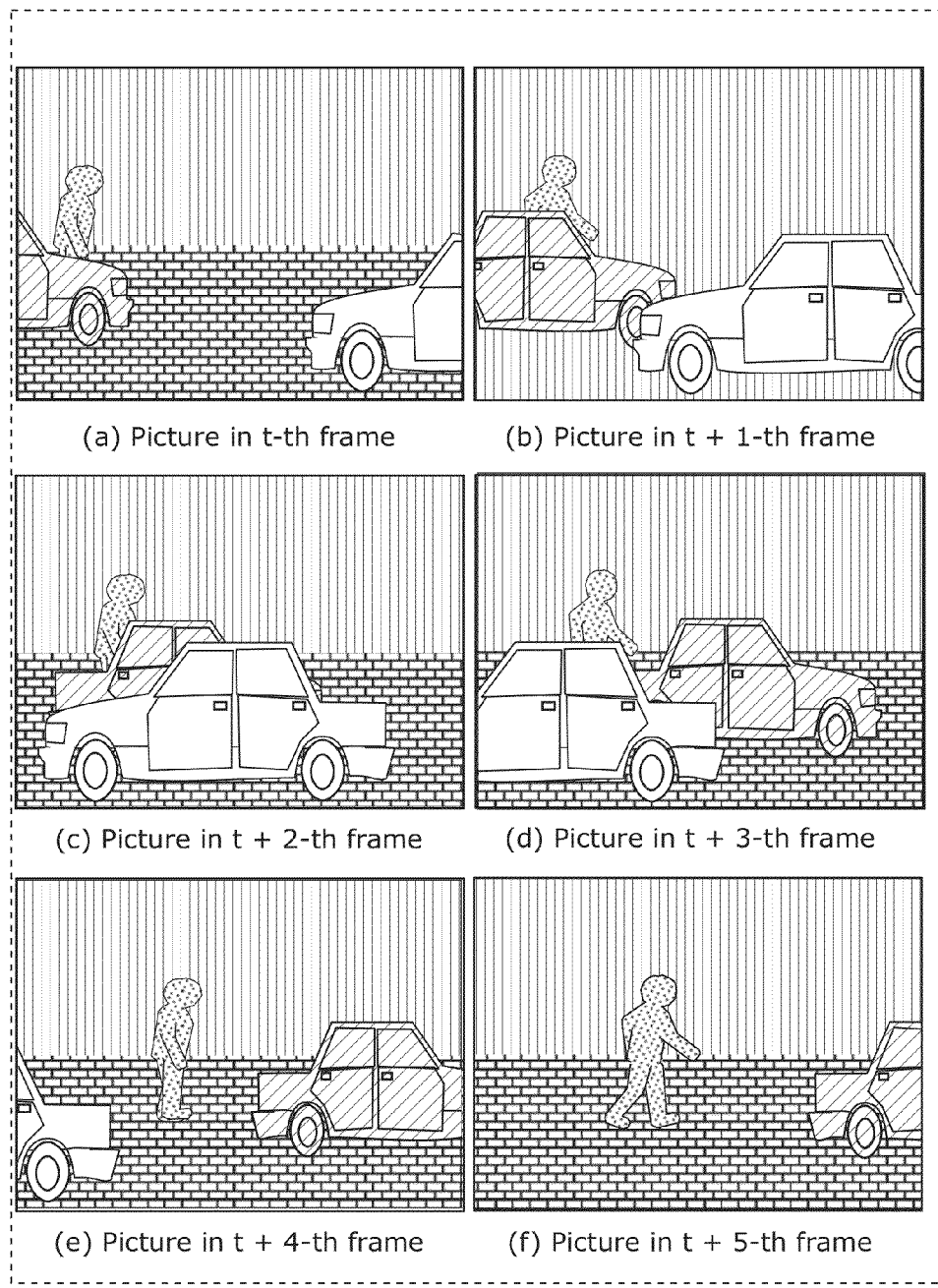
FIG. 26 exemplifies multiple pictures included in an input video sequence according to Embodiment 2.

FIG. 26 exemplifies multiple pictures included in an input video sequence according to Embodiment 2. Specifically, the illustrations (a) to (f) in FIG. 26 exemplify pictures obtained in the capturing by the camera 110 of the scene illustrated in FIG. 25. Here, the video obtaining unit 101 obtains multiple pictures (N frames). In Embodiment 2, the inputted video sequence is a 10-second (N=300) video sequence.

In the regionally dividing step S352, the segmentation unit 152 obtains the pictures from the video obtaining unit 101. Then, the segmentation unit 152 divides each of the pictures into multiple regions (divided regions) for each object, and generates partial video sequences each having a set of divided regions associated with one another between the pictures.

In Embodiment 2, the segmentation unit 152 further analyzes multiple trajectories for each of the generated partial video sequences (in other words, the motions of the point N between T pictures (Expression 1)), and estimates motion information on each of sets of the divided regions.

Here, the motion information includes (a) information indicating whether or not a divided region presents an articulated motion, (b) information indicating whether or not the divided region presents a rigid motion, and (c) information indicating whether or not the divided region is in a static state. It is noted that the motion information does not have to include all the three kinds of information. For example, of the three kinds of information, the motion information may include one or two kinds of information alone.

Specifically, the segmentation unit 152 determines whether or not a divided region presents a rigid motion from the trajectories based on, for example, a ranking analysis and an application to a geometric model. Such a determination is disclosed in references such as NPL 2, and the details thereof shall be omitted.

Furthermore, for example, the segmentation unit 152 determines whether or not a divided region presents an articulated motion from the trajectories based on temporal changes in the geodetic distance and the Euclidean distance between trajectories. Such a determination technique is disclosed in PTL 4 (Japanese Patent No. 4994525), and the details thereof shall be omitted.

Figure 27:
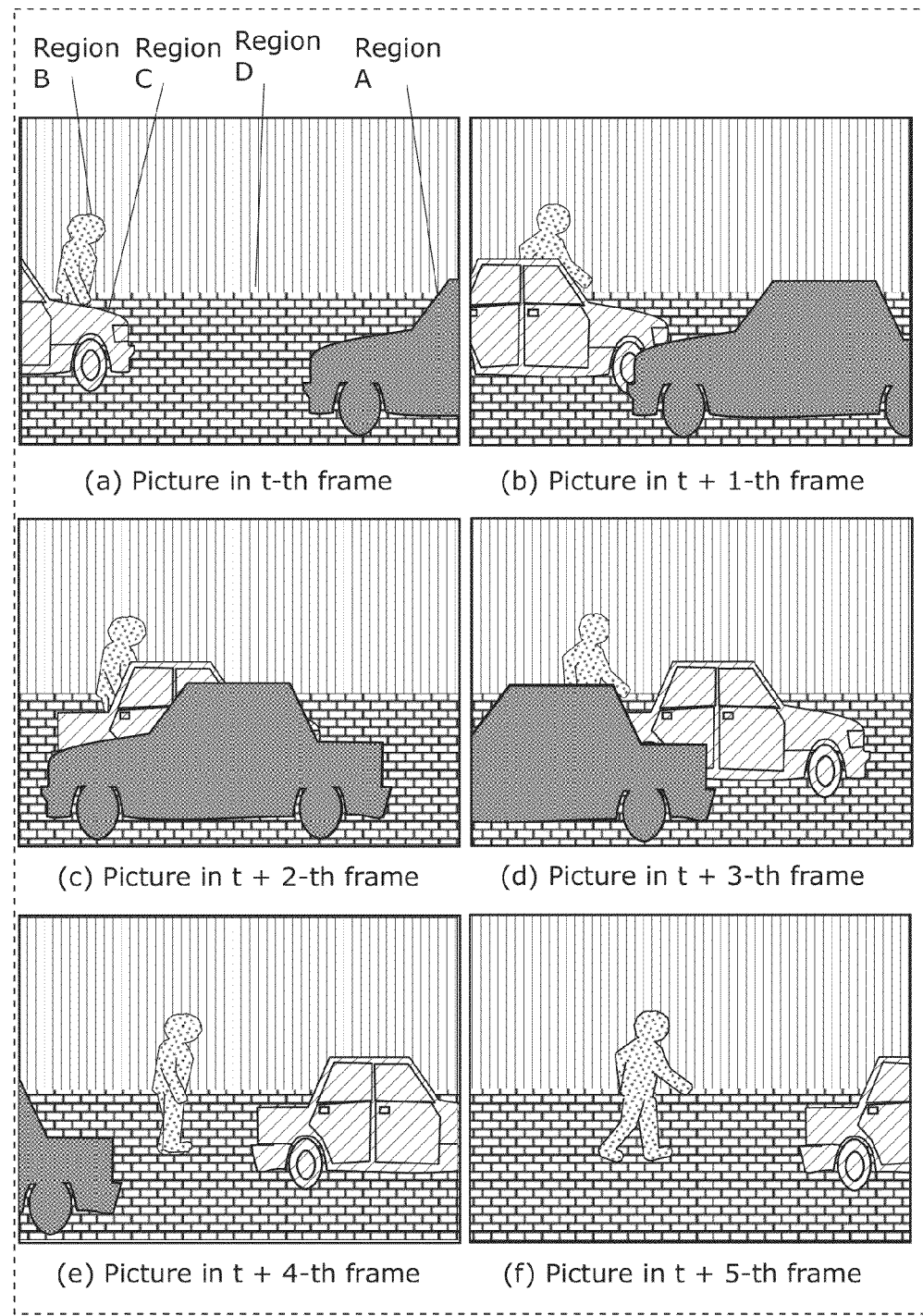
FIG. 27 exemplifies a result of a regional division and a removal region according to Embodiment 2.

FIG. 27 exemplifies a result of a regional division according to Embodiment 2. Specifically, FIG. 27 illustrates an example of the regionally dividing information obtained by the segmentation unit 102 dividing each of the pictures in FIG. 26 into four divided regions (regions A to D). The illustrations (a) to (f) in FIG. 27 represent data of the four divided regions (regions A to D) associated with each of the pixels in the pictures illustrated in (a) to (f) in FIG. 26. In other words, the illustrations (a) to (f) in FIG. 27 represent a partial video sequence which is a set of divided regions associated with one another between the pictures.

Figure 28:
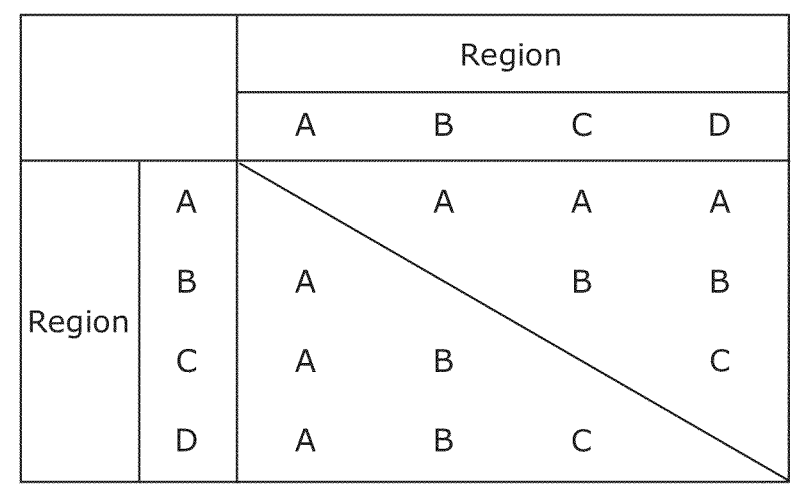

FIG. 28 exemplifies overlapping relationship information according to Embodiment 2. Specifically, FIG. 28 presents which divided region is estimated to appear in the foreground as a result of estimating an overlapping relationship between two of the four divided regions obtained by the segmentation unit 102. For example, FIG. 28 presents that the region B appears in the background of the region A, and in the foreground of the regions C and D. Moreover, in Embodiment 2, the segmentation unit 102 is to estimate that the region A presents a rigid motion, the region B presents an articulated motion, the region C presents a rigid motion, and the region D is in a static state.

Next, in the removal region determining step S303, the removal region determining unit 103 determines, as removal regions, a set of the divided regions included in one of the partial video sequences generated by the segmentation unit 102 as the removal region determining unit 103 does so in Embodiment 1.

Here, the removal region determining unit 103 determines that the region A (shadowed region) in FIG. 27 is a removal region.

Next, in the completion technique determining step S354, the completion technique determining unit 154 determines a technique for completing each of partial video sequences, based on the regionally dividing information generated by the segmentation unit 102, on the removal region determined by the removal region determining unit 103, and on the motion information on each partial video sequence.

FIG. 24 exemplifies a completion technique determining rule according to Embodiment 2. Embodiment 1 describes a technique—the space-time completion—as the technique for completing a partial video sequence. In Embodiment 2, instead, the completion technique determining unit 154 selects a technique from among the three completion techniques—the space-time completion, the generation of a static background image, and the generation of a mosaic image—, and completes a partial video sequence based on the motion information on the partial video sequence.

Specifically, if the estimation indicates that an articulated motion is presented in a set of the divided regions, for example, the completion technique determining unit 154 determines the space-time completion as a technique for completing a partial video sequence including the divided region. The space-time completion is an exemplary first completion technique based on the periodicity of the articulated motion.

If the estimation indicates that a rigid motion is presented in a set of the divided regions, for example, the completion technique determining unit 154 determines the generation of a mosaic image as a technique for completing a partial video sequence including the divided region. The generation of a mosaic image is an exemplary second completion technique based on characteristics of the rigid motion.

If the estimation indicates that a static state is presented in a set of the divided regions, for example, the completion technique determining unit 154 determines the generation of a static background image as a technique for completing a partial video sequence including the divided region. The generation of a static background image is an exemplary third completion technique based on characteristics of a static object.

In the occluded region completing step S355, based on multiple partial video sequences and a completion technique determined by the completion technique determining unit 104, the occluded region completing unit 155 completes an image in the occluded region in each of the partial video sequences, and generates completed partial video sequences. The three completion techniques used in the occluded region completing step S355 (the generation of a static background image, the generation of a mosaic image, and the space-time completion) are respectively disclosed in PTL 2, PTL 3, and NPL 1. Hence, the details thereof shall be omitted.

Furthermore, in the occluded region completing step S355, the occluded region completing unit 155 superimposes the generated completed partial video sequences and partial video sequences over one another, and generates a completed video sequence.

Finally, in the video outputting step S306, the video outputting unit 106 outputs the generated completed video sequence to the display 120.

Figure 29:
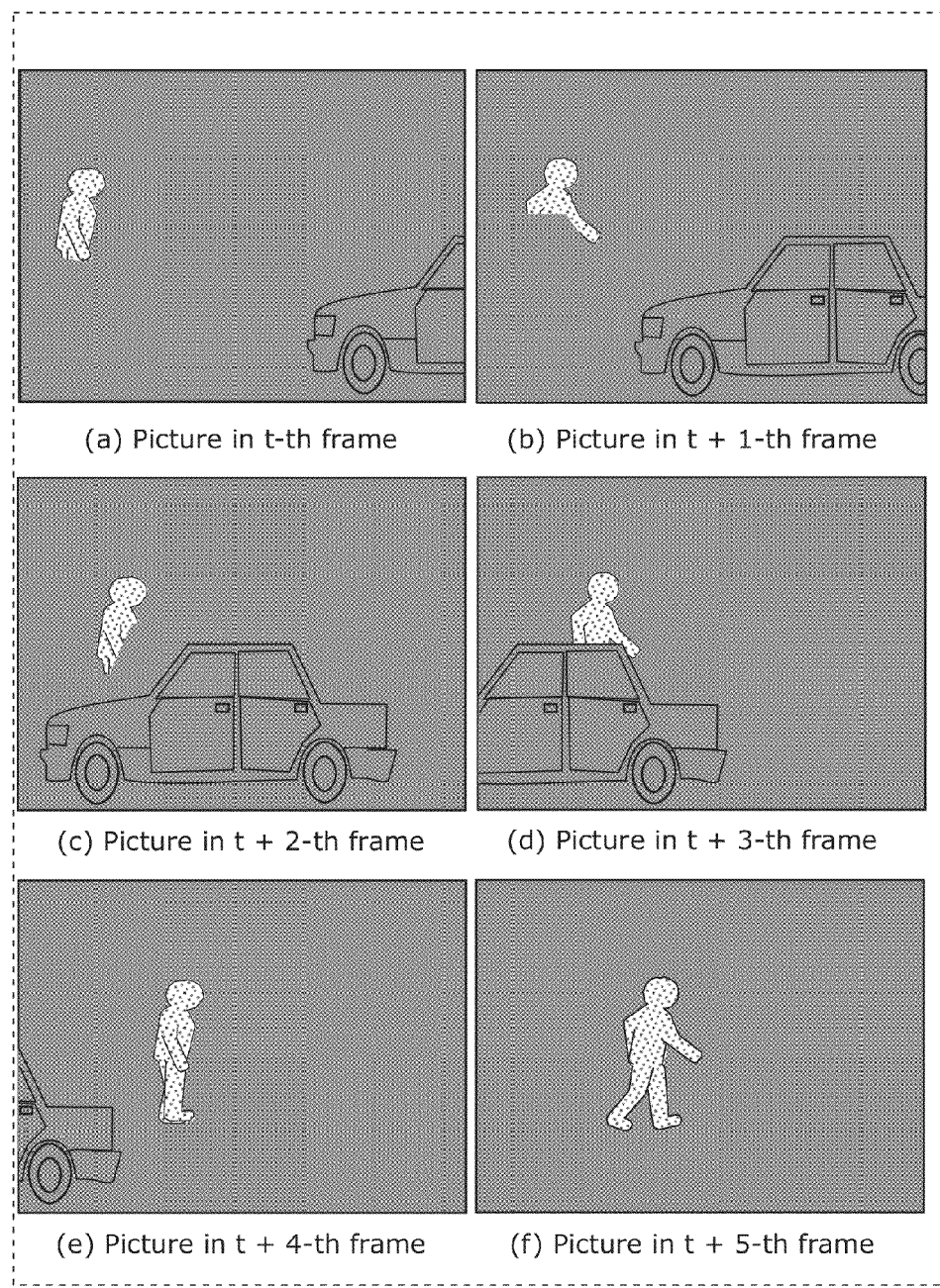
FIG. 29 exemplifies a partial video sequence for a region B according to Embodiment 2.

Described hereinafter is an exemplary operation in the occluded region completing step S355, with reference to FIGS. 29 to 35. FIGS. 29, 31, and 33 exemplify partial video sequences for the regions B, C, and D. In the occluded region completing step S355, the occluded region completing unit 155 appropriately completes an image in the occluded region for each of the partial video sequences, and generates completed video sequences. Each of the completed video sequences is a video sequence with a removal region removed. According to a completion technique determined by the completion technique determining unit 154, the occluded region completing unit 155 in Embodiment 2 completes an image in the occluded region for each of the partial video sequences including one of the regions B, C, and D, and generates completed partial video sequences.

Here, the region B is estimated by the segmentation unit 102 to present the articulated motion. The region C is estimated to present the rigid motion. Furthermore, the region D is estimated to appear in a static state. Hence, by the completion technique determination rule in FIG. 24, the completion technique determining unit 154 determines, as the completion techniques for the partial video sequences including one of the regions B to D, the three different completion techniques of the space-time completion, the generation of a static background image, and the generation of a mosaic image. As a result, the occluded region completing unit 155 completes an image in the occluded region for each of the partial video sequences including one of the regions B to D.

Figure 30:
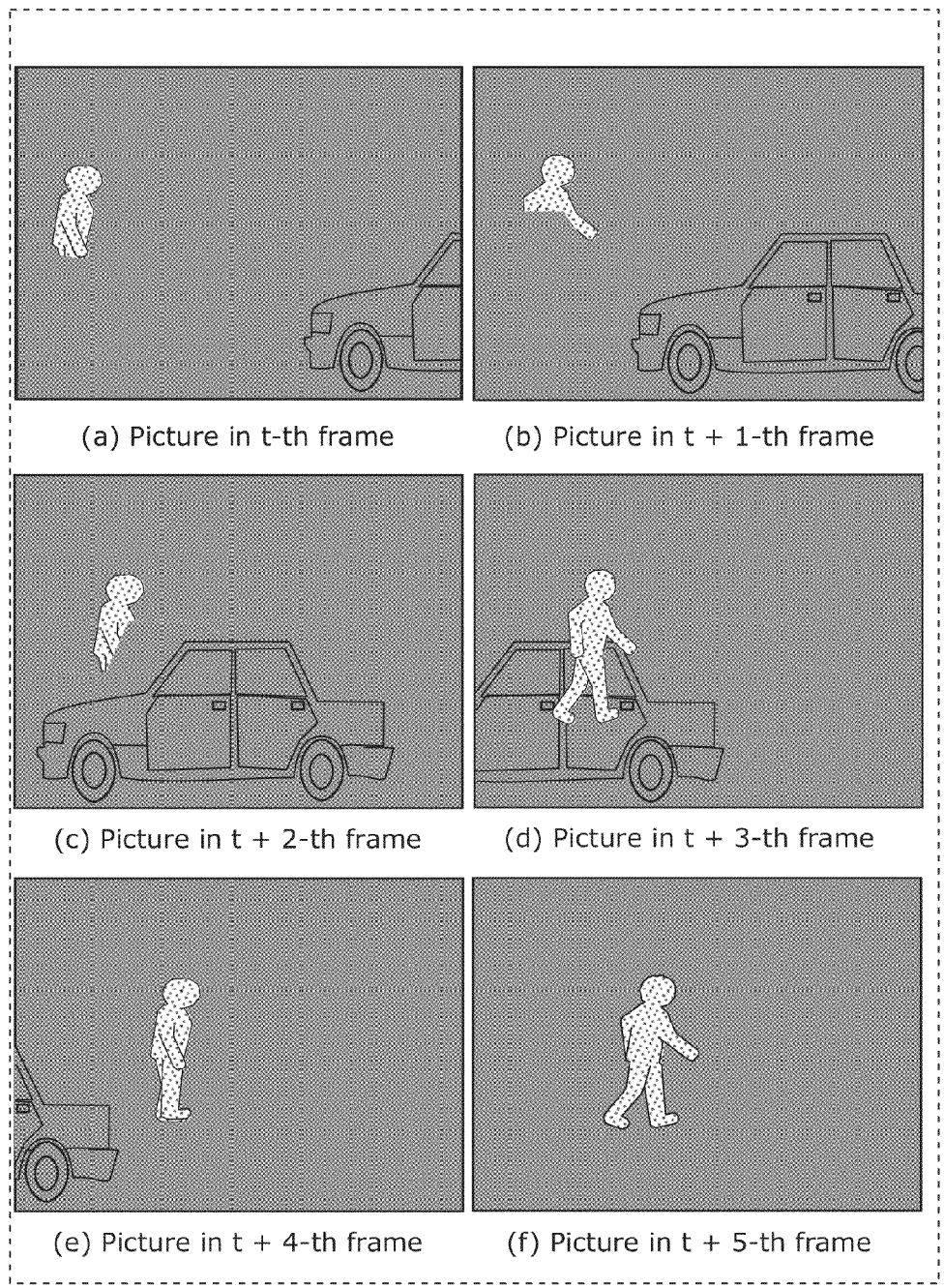
FIG. 30 exemplifies a completed partial video sequence for the region B according to Embodiment 2.
Figure 31:
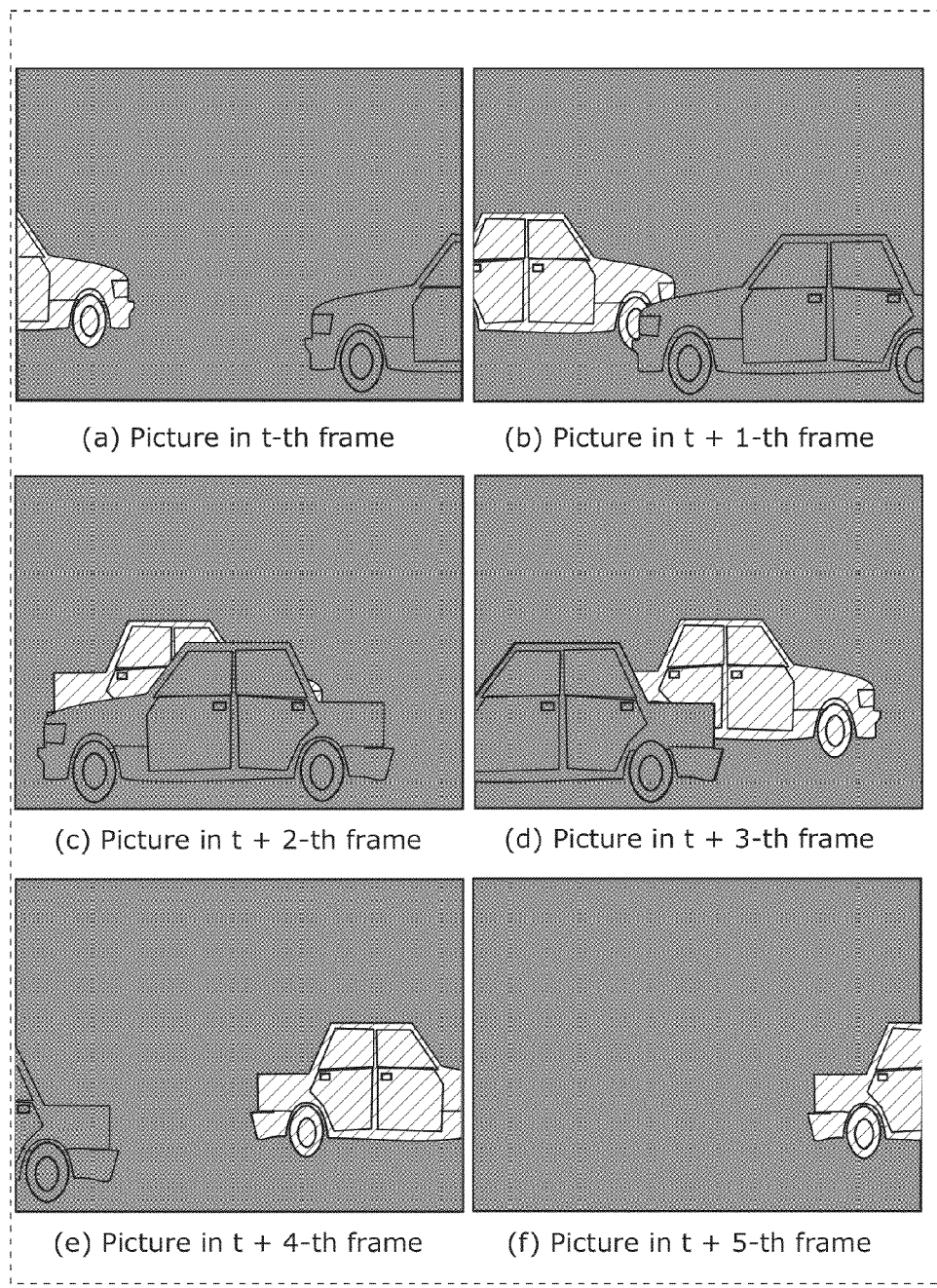
FIG. 31 exemplifies a partial video sequence for a region C according to Embodiment 2.

FIG. 30 exemplifies a completed partial video sequence generated by completing an image in the occluded region included in the partial video sequence for the region B presenting the articulated motion, using the space-time completion. As described in Embodiment 1, the space-time completion is to complete an image in the occluded region, using an image found in another picture and matching with the image in the occluded region. A partial video sequence including a divided region presenting a periodical motion, such as a walking person (articulated object), is likely to periodically include another divided region matching with the divided region. Hence, when the divided region is estimated to present the articulated motion, the occluded region completing unit 155 can appropriately complete the image in the occluded region by the space-time completion.

Figure 32:
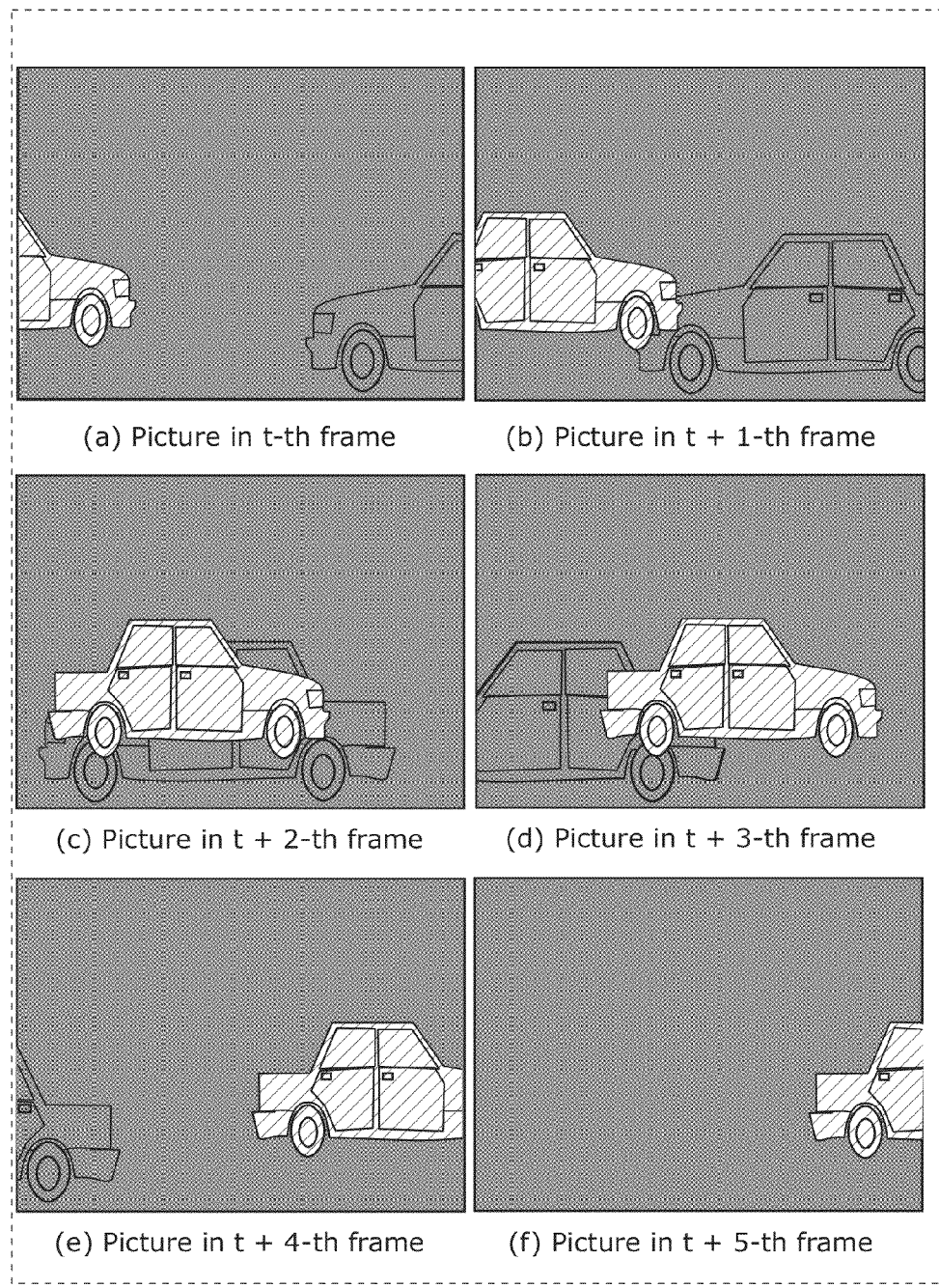
FIG. 32 exemplifies a completed partial video sequence for the region C according to Embodiment 2.
Figure 33:
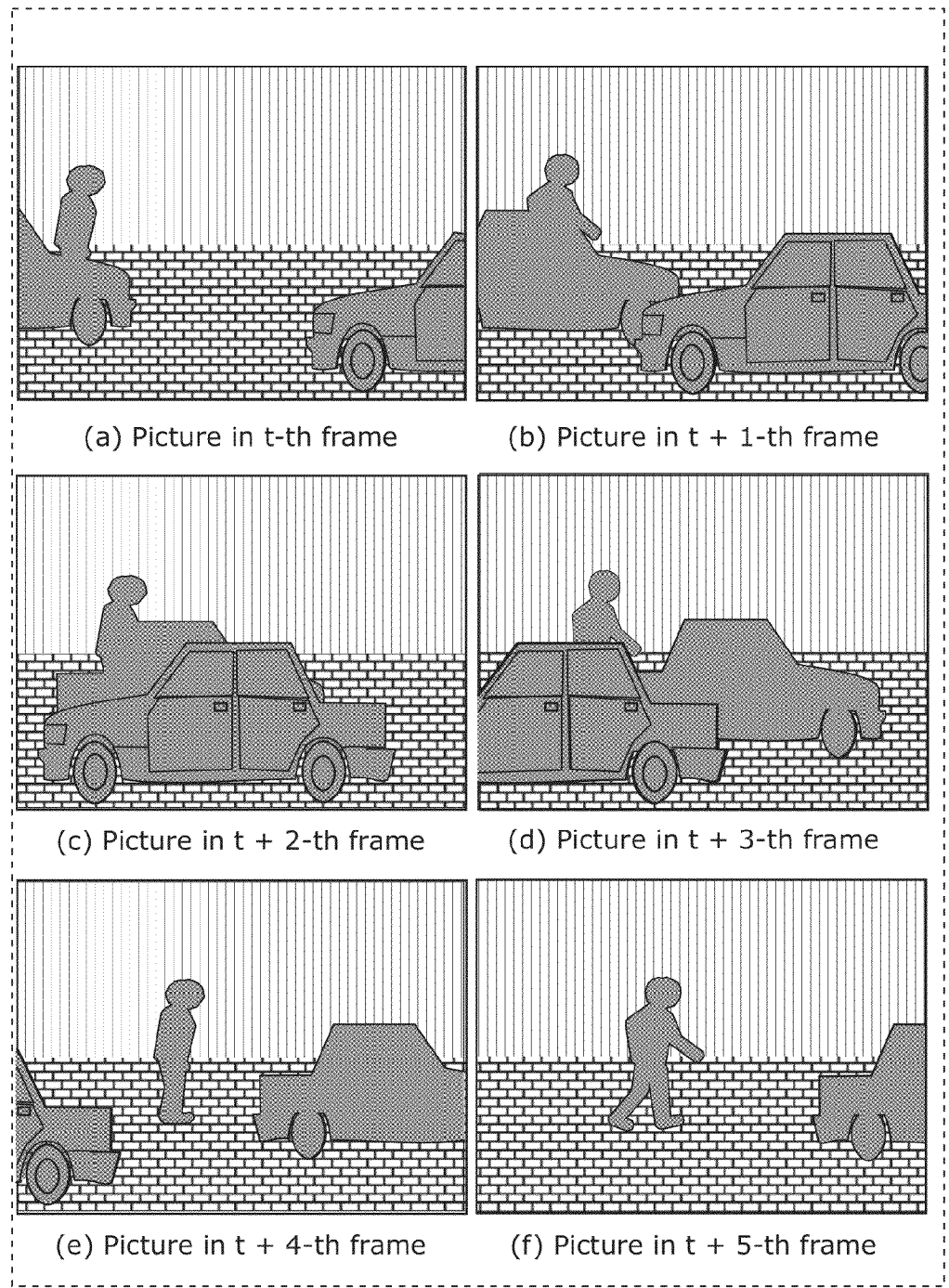
FIG. 33 exemplifies a partial video sequence for a region D according to Embodiment 2.

FIG. 32 exemplifies a completed partial video sequence generated by completing an image in the occluded region included in the partial video sequence for the region C presenting the rigid motion, using the generation of a mosaic image. The generation of a mosaic image is to complete an occluded region of a temporarily occluded object using preceding and succeeding pictures and a motion presented in a region in the vicinity of the occluded region, on the assumption that the two regions for the object are matching with each other.

The motion in the occluded region including the object presenting the rigid motion is assumed to match with a motion in a region in the vicinity of the occluded region. In the case where a divided region is estimated to present a rigid motion, the occluded region completing unit 155 appropriately completes the image in the occluded region by the generation of a mosaic image.

Furthermore, the region C in FIG. 31 provides a relatively large object region for the entire image, and the entire object does not fit in a single picture. Hence, in some cases, the region over the entire object might not be completed by the space-time completion for completing the image in the occluded region, using a matching region in another picture. In contrast, the generation of a mosaic image completes the image in the occluded region using a combination of preceding and succeeding pictures, on the assumption that the motions in the occluded region and a region in the vicinity of the occluded region match with each other. Hence, the occluded region completing unit 155 can appropriately complete the image in the occluded region even though an image of the entire object does not fit in a single picture.

Figure 34:
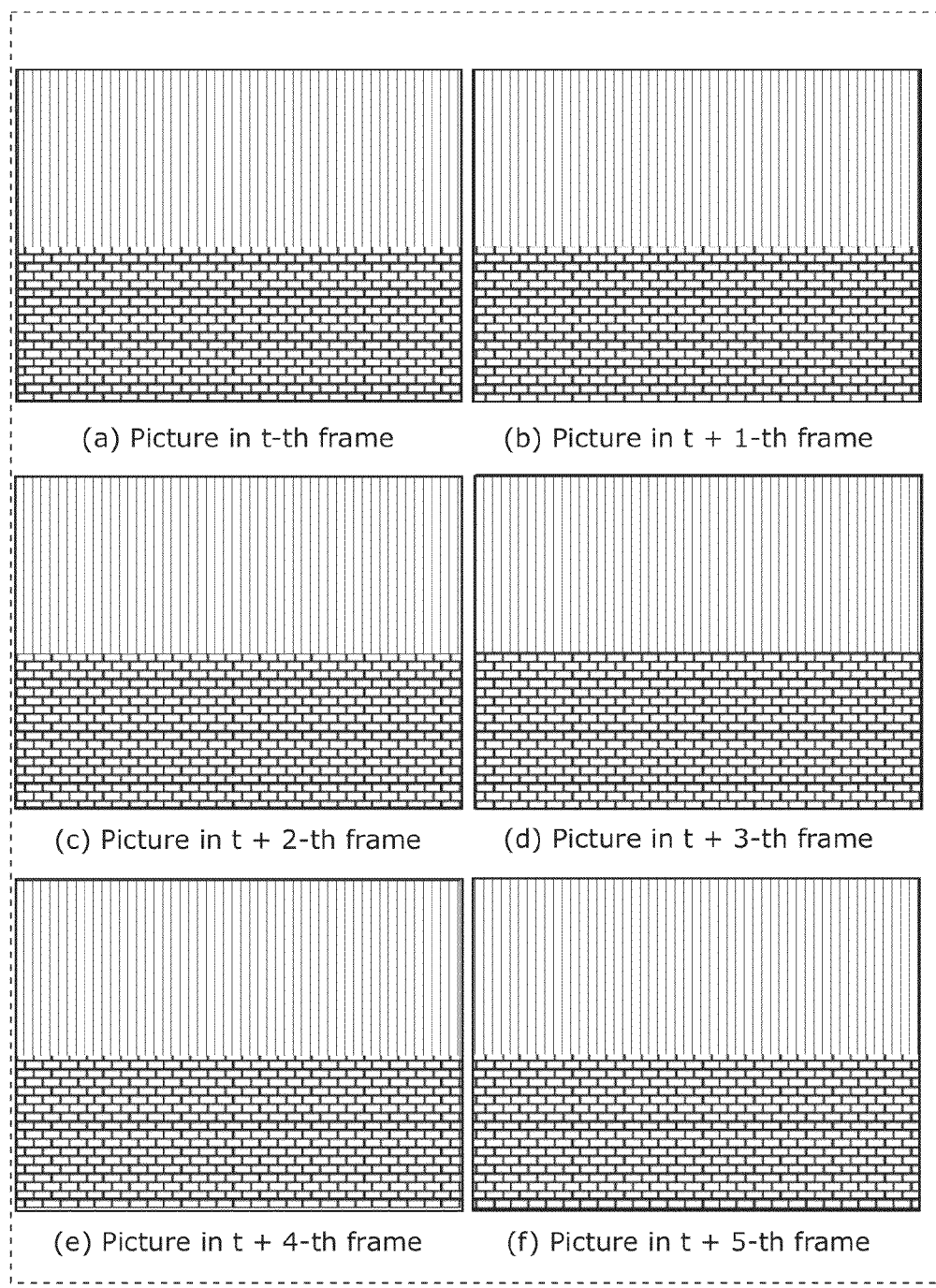
FIG. 34 exemplifies a completed partial video sequence for the region D according to Embodiment 2.

FIG. 34 exemplifies a completed partial video sequence generated by completing an image in the occluded region included in the partial video sequence for the region D which is in a static state, using the generation of a static background image. The generation of a static background image can complete an image in the occluded region by generating a single still image using all the pictures, based on the assumption that the object is staying still.

The generation of a static background image completes an image in the occluded region, using an image presenting the occluded region at the same position in another picture. In other words, the generation of a static background image does not require the searching processing (processing to search another picture for a matching region) in the space-time completion. Hence, the occluded region completing unit 155 can achieve less processing load or less processing time in completing the image in the occluded region by the generation of a static background image than by the space-time completion.

Similarly, the generation of a static background image does not require the estimating processing (processing to estimate a motion between the pictures) and the superimposition processing (superimposing images based on the motion) in the generation of a mosaic image. Hence, the occluded region completing unit 155 can achieve less processing load or less processing time in completing the image in the occluded region by the generation of a static background image than by the generation of a mosaic image.

As described above, since the completion technique determining unit 154 determines a technique for completing a partial video sequence based on the motion of a divided region included in the partial video sequence, the occluded region completing unit 155 can generate a more appropriate completed partial video sequence and achieve less processing road or less processing time for generating the completed partial video sequence.

Figure 35:
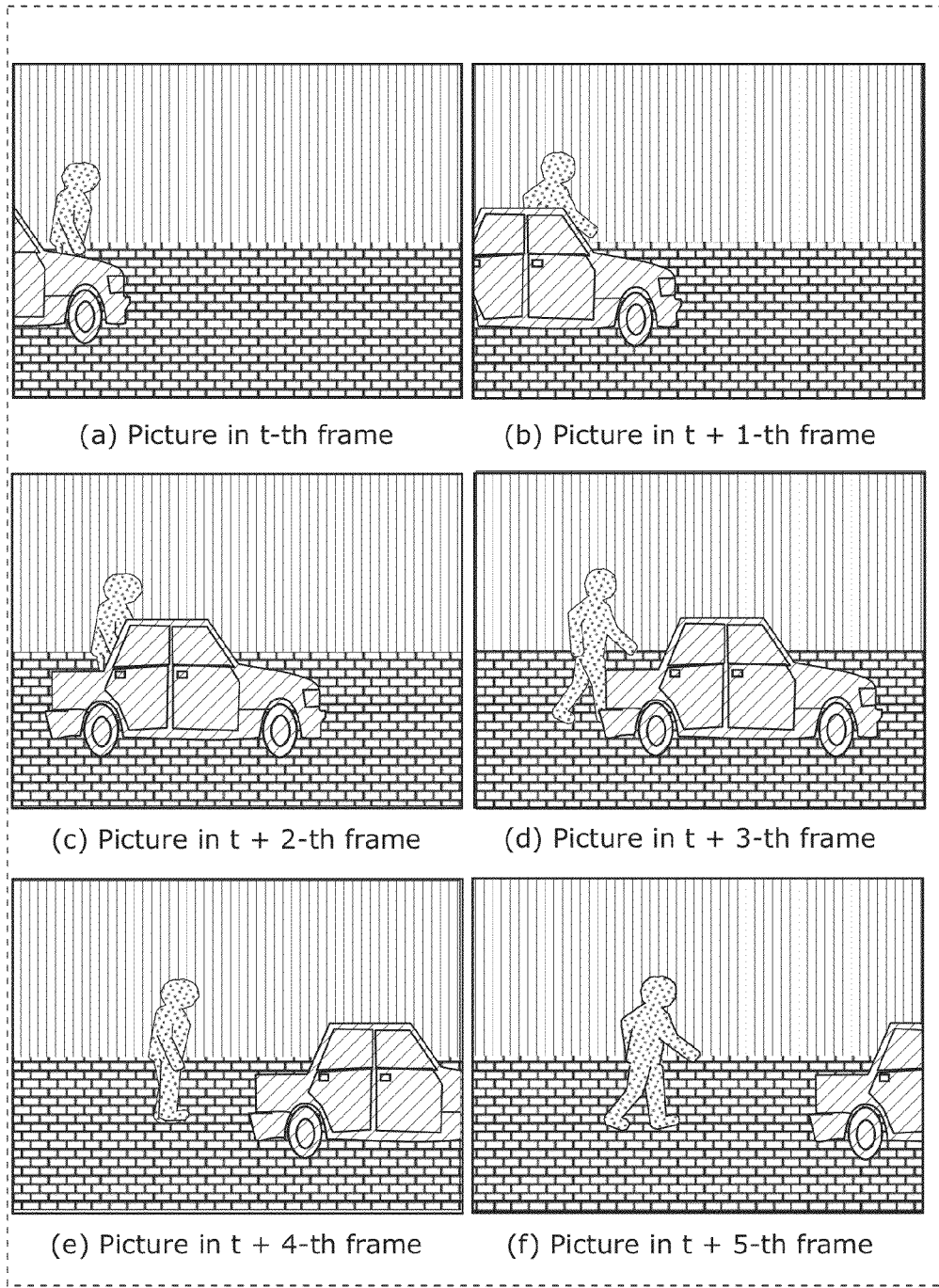
FIG. 35 exemplifies a completed video sequence according to Embodiment 2.

FIG. 35 exemplifies a completed video sequence generated by superimposing the completed partial video sequences for the regions B to D over one another.

As described above, the video generating apparatus 150 according to Embodiment 2 can appropriately complete an image in an occluded region, as the video generating apparatus 100 in Embodiment 1 can do so, even though multiple dynamic objects are occluded in a removal region by a removal target object. In other words, the video generating apparatus 150 can generate a completed video sequence which appears as if the removal target object did not exist from the beginning.

Moreover, the completion technique determining unit 154 in Embodiment 2 determines a technique for completing each of the partial video sequences, depending on motion information on each of sets of the divided region. Then, according to the determined completion technique, the occluded region completing unit 155 completes an image in the occluded region included in each of the partial video sequences. Thanks to such features, the occluded region completing unit 155 can generate a completed partial video sequence by a completion technique suitable to a partial video sequence for each object, particularly in the case where a single removal region occludes multiple objects each presenting a different motion. In other words, the occluded region completing unit 155 can adaptively complete each of the partial video sequences depending on the motion of a divided region, contributing to more appropriately completing the image in the occluded region.

Furthermore, if an articulated motion is presented in a set of the divided regions of a first partial video sequence, the completion technique determining unit 154 can determine that, for example, the space-time completion is the technique for completing the first partial video sequence. Hence, the completion technique determining unit 154 can determine a completion technique suitable to the articulated motion as the completion technique for the first partial video sequence, and the occluded region completing unit 155 can more appropriately complete an image in an occluded region included in the first partial video sequence.

Furthermore, if a rigid motion is presented in a set of the divided regions of a second partial video sequence, the completion technique determining unit 154 can determine that, for example, the generation of a mosaic image is the technique for completing the second partial video sequence. Hence, the completion technique determining unit 154 can determine a completion technique suitable to the articulated motion as the completion technique for the second partial video sequence, and the occluded region completing unit 155 can more appropriately complete an image in an occluded region included in the second partial video sequence.

Furthermore, if a static state is presented in a set of the divided regions of the third partial video sequence, the completion technique determining unit 154 can determine that, for example, the generation of a static background image is the technique for completing the third partial video sequence. Hence, the completion technique determining unit 154 can determine a completion technique suitable to a static object as the completion technique for the third partial video sequence, and the occluded region completing unit 155 can more appropriately complete an image in an occluded region included in the third partial video sequence.

The herein disclosed subject matter is to be considered descriptive and illustrative only, and the appended Claims are of a scope intended to cover and encompass not only the particular embodiments disclosed, but also equivalent structures, methods, and/or uses.

In each of the above embodiments, for example, the video obtaining unit 101 obtains an input video sequence from the camera 110. The video obtaining unit 101, however, does not necessarily have to obtain the input video sequence from the camera 110. For example, the video obtaining unit 101 may obtain an input video sequence from a storage apparatus which stores the input video sequence that has previously been captured. In other words, the video obtaining unit 101 does not have to immediately obtain a captured video as an input video sequence. Furthermore, the video obtaining unit 101 may obtain an input video sequence with any given technique.

In each of the above embodiments, the removal region determining unit 103 selects at least one of partial video sequences based on an input, and determines, as a removal region, at least one set of the divided regions included in the selected at least one of the partial video sequences. The removal region determining unit 103, however, does not necessarily have to the removal region in such a manner. In other words, the removal region determining unit 103 does not necessarily have to select a partial video sequence for the determination of a removal region. For example, the removal region determining unit 103 may directly determine, as a removal region, a region which appears and is touched by the user on an input video sequence displayed on a touch screen. Moreover, the removal region determining unit 103 may determine a removal region without an input. For example, the removal region determining unit 103 may obtain a depth map of an input video sequence, and, with reference to the obtained depth map, determine, as the removal region, the region of an object which is closer to the camera than the focal point is.

In each of the embodiments, the occluded region completing units 105 and 155 hold an image in an occluded region only for a partial video sequence including a divided region which abuts a removal region. The occluded region completing units 105 and 155, however, do not necessarily have to execute completion as described above. For example, the occluded region completing units 105 and 155 may complete an image in an occluded region for all the partial video sequences. Here, the video generating apparatus 100 in Embodiment 1 does not have to include the completion technique determining unit 104. In other words, the video generating apparatus 100 does not have to execute the step S304 in FIG. 3.

In each of the embodiments, the segmentation unit 102 generates, as a single partial video sequence, a set of divided regions associated with one another between pictures; however, the set of divided regions included in the partial video sequence does not have to be a single set. In addition, the segmentation unit 102 estimates an overlapping relationship between partial video sequences (sets of divided regions); however, the estimation of the overlapping relationship does not have to be executed for each of the partial video sequences. For example, the segmentation unit 102 may estimate the overlapping relationship between the divided regions for each of pictures.

In each of the embodiments, the occluded region completing units 105 and 155 generates completed partial video sequences by completing an image in an occluded region included in each of partial video sequences, and superimposes the generated completed partial video sequences over one another; however, the technique to complete an image in an occluded region does not have to be defined as it is. For example, in the case where there is a pixel left uncompleted (uncompleted pixel) in a completed video sequence generated with processing similar to one described in each embodiment, the occluded region completing units 105 and 155 may complete the pixel value of the uncompleted pixel, using a partial video sequence. For example, the occluded region completing units 105 and 155 may use the partial video sequence located farthest back (farthest from the camera) to replicate onto the uncompleted pixel the pixel value of the pixel positioned closest to the uncompleted pixel. Hence, the occluded region completing units 105 and 155 can generate a completed video sequence with no uncompleted pixel left, even though the completion for each of the partial video sequence cannot entirely complete an image in an occluded region.

In each of the embodiments, the input video sequence is a single-view video sequence; however, the input video sequence may be a multi-view video sequence. Here, the video generating apparatuses 100 and 150 may generate a completed video sequence for, for example, a video sequence for each of view points. Specifically, for example, the video generating apparatuses 100 and 150 may obtain a left-eye video sequence and a right-eye video sequence as input video sequences, and generate a completed video sequence for each eye. Hence, the video generating apparatuses 100 and 150 can generate completed video sequences for, for example, a 3D video.

It is noted that, in each of the embodiments, the video generating apparatuses 100 and 150 do not include the camera 110 or the display 120; however, the video generating apparatuses 100 and 150 may include the camera 110 or the display 120.

It is noted that, in each of the embodiments, a completed video sequence includes multiple pictures; however, the completed video sequence does not necessarily have to include multiple pictures. In other words, a completed video sequence may be a single picture (in other words, a still image).

A part or all of the constituent elements constituting the respective apparatuses in each of the embodiments may be configured from a single System-LSI (Large-Scale Integration). For example, the video generating apparatus may be implemented in the form of a System-LSI including a video obtaining unit, a segmentation unit, a removal region determining unit, and an occluded region completing unit.

The System-LSI is a super-multi-function LSI manufactured by integrating constituent elements on one chip. Specifically, the System-LSI is a computer system including a microprocessor, a ROM, a RAM, or by means of a similar device. The ROM stores a computer program. The System-LSI performs its functions through the microprocessor's operation according to the computer program.

Furthermore, here, the computer system is referred to as System-LSI; instead, the computer system may also be referred to as IC, LSI, super LSI, and ultra LSI, depending on a difference in the degree of integration. Furthermore, the means for circuit integration is not limited to the LSI, and implementation in the form of a dedicated circuit or a general-purpose processor is also available. In addition, it is also acceptable to use a Field Programmable Gate Array (FPGA) that is programmable after the LSI has been manufactured, and a reconfigurable processor in which connections and settings of circuit cells within the LSI are reconfigurable.

Furthermore, if an integrated circuit technology that replaces the LSI appears thorough the progress in the semiconductor technology or another derived technology, that technology can naturally be used to carry out integration of the functional blocks. Biotechnology can be applied to the integrated circuit technology.

An implementation of the present disclosure may be a video generating method including, in the form of steps, the characteristic constitutional elements in the video generating apparatus. An implementation of the present disclosure may be a computer program which causes a computer to execute each of the characteristic steps included in the video generating method. An implementation of the present disclosure may be a non-transitory computer-readable recording medium for use in a computer, and the recording medium has such a computer program recorded thereon.

Each of the structural elements in the above-described embodiments may be configured in the form of an exclusive hardware product, or may be implemented by executing a software program suitable for the structural element. Each of the structural elements may be implemented by means of a program executing unit, such as a CPU and a processor, reading and executing the software program recorded on a recording medium such as a hard disk or a semiconductor memory. Here, the software program for implementing the video generating apparatus according to each of the embodiments is a program described below.

In other words, the program is of a video generating method for generating, from an input video sequence including objects, a video sequence by removing at least one of the objects. The video generating method includes: obtaining an input video sequence including pictures; dividing each of the pictures included in the input video sequence into multiple regions as divided regions, and generating partial video sequences each having a set of the divided regions associated with one another between the pictures; determining, as a removal region, a region of at least one of the objects included in the input video sequence; generating a completed video sequence by completing an image in an occluded region for each of the partial video sequences, thereby completing the partial video sequences, and by superimposing the partial video sequences over one another, the occluded region being a region of an other object occluded in the removal region by the at least one object; and outputting the completed video sequence.

The program causes a computer to execute the video generating method according to an implementation of the present disclosure.

The herein disclosed subject matter is to be considered descriptive and illustrative only, and the appended Claims are of a scope intended to cover and encompass not only the particular embodiments disclosed, but also equivalent structures, methods, and/or uses.

INDUSTRIAL APPLICABILITY

A video generating apparatus according to one or more exemplary embodiments disclosed herein is to generate, from an input video sequence including multiple objects, a video sequence or a still image by removing at least one of the objects. The video generating apparatus is applicable to a variety of systems, such as a broadcast video editing system, a monitoring camera system, a video coding system, and a multi-eye stereoscopic video image system.

The invention claimed is:

1. A video generating apparatus for generating, from an input video sequence including objects, a video sequence by removing at least one of the objects, the video generating apparatus comprising:
a processor; and
a non-transitory computer-readable medium having stored thereon executable instructions that, when executed by the processor, cause the video generating apparatus to function as:
a video obtaining unit configured to obtain an input video sequence including pictures;
a segmentation unit configured to divide each of the pictures included in the input video sequence into multiple regions as divided regions, and generate partial video sequences each having a set of the divided regions associated with one another between the pictures;
a removal region determining unit configured to determine, as a removal region, a region of at least one of the objects included in the input video sequence;
an occluded region completing unit configured to generate, for each of the partial video sequences, a completed video sequence by completing an image in an occluded region using an image in the partial video sequence, thereby completing the partial video sequences, and by superimposing the completed partial video sequences over one another, the occluded region being a region of an other object occluded in the removal region by the at least one object; and
a video outputting unit configured to output the completed video sequence.

2. The video generating apparatus according to claim 1, wherein the segmentation unit is configured to estimate motion information on each of sets of the divided regions,
wherein the executable instructions, when executed by the processor, cause the video generating apparatus to further function as a completion technique determining unit configured to determine a completion technique for each of the partial video sequences based on the motion information on a set of the divided regions of the partial video sequence, and
wherein, according to the determined completion technique, the occluded region completing unit is configured to complete the image in the occluded region for each of the partial video sequences.

3. The video generating apparatus according to claim 2, wherein the segmentation unit is configured to estimate the motion information including information indicating whether or not each of sets of the divided regions presents an articulated motion, and
if the estimation indicates that the articulated motion is presented in a set of the divided regions of a first partial video sequence included in the partial video sequences, the completion technique determining unit is configured to determine a first completion technique, which is based on periodicity of the articulated motion, for completing the first partial video sequence.

4. The video generating apparatus according to claim 3, wherein if the determination indicates that the first completion technique is for completing the first partial video sequence, the occluded region completing unit is configured to, on each of pictures included in the first partial video sequence, (a) search an other picture included in the first partial video sequence for a matching region which matches a search target region including an occluded region in the picture, and (b) complete the image in the occluded region by replicating an image in the matching region onto the occluded region.

5. The video generating apparatus according to claim 3, wherein the segmentation unit is configured to estimate the motion information including information indicating whether or not each of sets of the divided regions presents a rigid motion, and
if the estimation indicates that the rigid motion is presented in a set of the divided regions of a second partial video sequence included in the partial video sequences, the completion technique determining unit is configured to determine a second completion technique, which is different from the first completion technique and based on a characteristic of the rigid motion, for completing the second partial video sequence.

6. The video generating apparatus according to claim 3, wherein the segmentation unit is configured to estimate the motion information including information indicating whether or not each of sets of the divided regions is in a static state, and
if the estimation indicates that the static state is presented in a set of the divided regions of a third partial video sequence included in the partial video sequences, the completion technique determining unit is configured to determine a third completion technique, which is different from the first completion technique and based on a characteristic of a static object, for completing the third partial video sequence.

7. The video generating apparatus according to claim 1, wherein the segmentation unit is configured to estimate a spatial overlapping relationship between the divided regions, and
based on the estimated spatial overlapping relationship, the occluded region completing unit is configured to superimpose the completed partial video sequences over one another, and generate the completed video sequence.

8. The video generating apparatus according to claim 1, wherein the occluded region completing unit is configured to complete the image in the occluded region only for a partial video sequence including a divided region which abuts the removal region, the partial video sequence being included in the partial video sequences and the divided region being included in the divided regions.

9. The video generating apparatus according to claim 8, wherein the occluded region completing unit is configured to complete the image in the occluded region only for a picture including the divided region that abuts the removal region, the picture being included in the pictures in the partial video sequence including the divided region that abuts the removal region.

10. The video generating apparatus according to claim 1, wherein the removal region determining unit is configured to select at least one of the partial video sequences based on an input indicating the at least one of the objects, and determine, as the removal region, at least one set of the divided regions included in the selected at least one of the partial video sequences.

11. The video generating apparatus according to claim 1, wherein, for each of the partial video sequences, the occluded region completing unit is configured to search on each of pictures which are included in a corresponding one of the partial video sequences, in another picture included in the corresponding one of the partial video sequences, for a matching region which matches with a search target region including an occluded region in the picture, replicate an image in the matching region onto the occluded region, and complete the image in the occluded region.

12. A video generating method for generating, from an input video sequence including objects, a video sequence by removing at least one of the objects, the video generating method comprising:

obtaining an input video sequence including pictures;

dividing each of the pictures included in the input video sequence into multiple regions as divided regions, and generating partial video sequences each having a set of the divided regions associated with one another between the pictures;

determining, as a removal region, a region of at least one of the objects included in the input video sequence;

generating, for each of the partial video sequences, a completed video sequence by completing an image in an occluded region using an image in the partial video sequence, thereby completing the partial video sequences, and by superimposing the completed partial video sequences over one another the occluded region being a region of an other object occluded in the removal region by the at least one object; and outputting the completed video sequence.

13. A non-transitory computer-readable recording medium for use in a computer, the recording medium having a computer program recorded thereon for causing the computer to execute the video generating method according to claim 12.

* * * * *